US012810076B1

(12) United States Patent
Yu et al.

(10) Patent No.: US 12,810,076 B1
(45) Date of Patent: Nov. 24, 2026

(54) DATA-DIVERSITY METRICS FOR MODEL TRAINING DATA

(71) Applicant: Amazon Technologies, Inc., Seattle, WA (US)

(72) Inventors: Xini Yu, Redmond, WA (US); Anjie Fang, Mountlake Terrace, WA (US); Zhenyu Shi, Sammamish, WA (US); Zheng Du, Bellevue, WA (US); Byung Sun Yang, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 307 days.

(21) Appl. No.: 18/621,804

(22) Filed: Mar. 29, 2024

(51) Int. Cl.

| | |
|---|---|
| ***G06F 40/30*** | (2020.01) |
| ***G06F 40/284*** | (2020.01) |
| ***G10L 15/16*** | (2006.01) |
| *G06F 40/205* | (2020.01) |
| *G06F 40/289* | (2020.01) |
| *G10L 15/06* | (2013.01) |

(Continued)

(52) U.S. Cl.
CPC ............ *G06F 40/30* (2020.01); *G06F 40/284* (2020.01); *G10L 15/16* (2013.01); *G06F 40/205* (2020.01); *G06F 40/289* (2020.01); *G10L 15/063* (2013.01); *G10L 15/065* (2013.01); *G10L 15/18* (2013.01); *G10L 15/1815* (2013.01); *G10L 15/1822* (2013.01)

(58) Field of Classification Search
None
See application file for complete search history.

(56) References Cited

U.S. PATENT DOCUMENTS

| | | | | |
|---|---|---|---|---|
| 6,052,657 A | | 4/2000 | Yamron et al. | |
| 9,892,730 B2 | | 2/2018 | Houghton et al. | |
| 10,741,092 B1 | * | 8/2020 | Meisner | G06F 40/30 |

(Continued)

FOREIGN PATENT DOCUMENTS

| | | |
|---|---|---|
| CN | 117453888 A | 1/2024 |

OTHER PUBLICATIONS

Yves Bestgen, "Measuring Lexical Diversity in Texts: The Twofold Length Problem", https://doi.org/10.48550/arXiv.2307.04626, Jul. 29, 2023. (Year: 2023).*

(Continued)

*Primary Examiner* — Richard Z Zhu
(74) *Attorney, Agent, or Firm* — Pierce Atwood LLP

(57) ABSTRACT

Techniques for determining data diversity metrics for datasets are described. A system can determine data diversity metrics including topic diversity, readability, lexical diversity, semantic diversity, linguistic diversity and others. Some of the metrics correspond to individual records in the dataset and other metrics correspond to two or more records in the dataset (e.g., based on a comparison of the records). In some embodiments, the system can determine whether a dataset includes topically diverse records, whether the dataset includes structurally diverse records, and whether the dataset includes linguistically diverse records. In some embodiments, the system can determine a readability metric representing how easy a record is to read/understand. In some embodiments, the system can determine a topic corresponding to a record and a topic semantic diversity metric based on comparing summarized records.

20 Claims, 14 Drawing Sheets

(51) Int. Cl.
*G10L 15/065* (2013.01)
*G10L 15/18* (2013.01)

(56) References Cited

U.S. PATENT DOCUMENTS

| | | | | |
|---|---|---|---|---|
| 11,080,348 | B2 | 8/2021 | Chen et al. | |
| 11,176,456 | B2 | 11/2021 | Lee et al. | |
| 11,514,691 | B2 * | 11/2022 | Perera | G06V 30/40 |
| 11,556,712 | B2 * | 1/2023 | Glass | G06F 40/284 |
| 11,836,175 | B1 | 12/2023 | Malkiel et al. | |
| 12,354,011 | B2 * | 7/2025 | Biswas | G06N 3/088 |
| 2021/0342552 | A1 * | 11/2021 | Mishra | G06N 3/09 |
| 2023/0032208 | A1 * | 2/2023 | Kobren | G06F 18/214 |
| 2023/0036072 | A1 * | 2/2023 | Gao | G06F 16/3329 |
| 2023/0050134 | A1 * | 2/2023 | Biswas | G06N 3/084 |
| 2023/0112740 | A1 * | 4/2023 | Alqaderi | G06F 40/58 704/9 |
| 2024/0362417 | A1 * | 10/2024 | Imani | G06F 40/30 |
| 2024/0412039 | A1 * | 12/2024 | Herard | G06N 3/08 |
| 2024/0419923 | A1 * | 12/2024 | Chollampatt Muhammed Ashraf | G06F 16/345 |
| 2025/0097171 | A1 * | 3/2025 | Hu | G06F 8/35 |
| 2025/0110963 | A1 | 4/2025 | Jasoriya et al. | |
| 2025/0111169 | A1 * | 4/2025 | Srinivasan | G06N 3/08 |
| 2025/0181673 | A1 * | 6/2025 | Kobren | G06F 18/2148 |
| 2025/0378312 | A1 * | 12/2025 | Titon | G06N 3/0475 |

OTHER PUBLICATIONS

Scott Jarvis, "Capturing the Diversity in Lexical Diversity", Language Learning, vol. 63, Issue s1, https://doi.org/10.1111/j.1467-9922.2012.00739.x, Feb. 13, 2013. (Year: 2013).*

Baese-Berk et al., "Lexical Diversity, Lexical Sophistication, and Predictability for Speech in Multiple Listening Conditions", Frontiers in Psychology, Jun. 18, 2021. (see p. 6, "Lexical Diversity"). (Year: 2021).*

Dusek et al., "Evaluating the State of the Art of End to End natural Language Generation: The E2E NLG Challenge", Computer Speech & Language, https://arxiv.org/pdf/1901.07931, Jul. 24, 2019. (Year: 2019).*

Tevet et al., "Evaluating the Evaluation of Diversity in Natural Language Generation", Computation and Language, arXiv: 2004. 02990, Jan. 24, 2021. (Year: 2021).*

Alycia Lee, et al. "Beyond Scale: the Diversity Coefficient as a Data Quality Metric Demonstrates LLMs are Pre-trained on Formally Diverse Data," https://arxiv.org/pdf/2306.13840v2.pdf, Sep. 26, 2023, 20 pages.

Nils Reimers and Iryna Gurevych. "Sentence-BERT: Sentence Embeddings using Siamese BERT-Networks," https://arxiv.org/abs/1908.10084v1, Aug. 27, 2019, 11 pages.

Maarten Grootendorst. "BERTopic: Neural topic modeling with a class-based TF-IDF procedure," https://arxiv.org/abs/2203.05794v1, Mar. 11, 2022, 10 pages.

Guy Tevet, et al. "Evaluating the Evaluation of Diversity in Natural Language Generation," Proceedings of the 16th Conference of the European Chapter of the Association for Computational Linguistics, Apr. 2021, pp. 326-346. Retrieved from https://aclanthology.org/2021.eacl-main.25.pdf.

Mario Giulianelli, et al. "What Comes Next? Evaluating Uncertainty in Neural Text Generators Against Human Production Variability," https://arxiv.org/pdf/2305.11707.pdf, 2023, 23 pages.

Benjamin Wilson, et al. "Non-adjacent Dependency Learning in Humans and Other Animals," Topics in Cognitive Science, 2018, pp. 1-16. Retrieved from https://www.researchgate.net/figure/Adjacent-and-nonadjacent-dependencies-in-several-commonly-used-artificial-grammar_fig1_327537698.

Yue Yu, et al. "Large Language Model as Attributed Training Data Generator: A Tale of Diversity and Bias," https://arxiv.org/pdf/2306.15895. pdf, Oct. 18, 2023, 45 pages.

Wayne Xin Zhao, et al. "A Survey of Large Language Models," https://arxiv.org/abs/2303.18223v13, Nov. 24, 2023, 124 pages.

Zige Wang, et al. "Data Management For Large Language Models: A Survey," https://arxiv.org/abs/2312.01700v2, Dec. 26, 2023, 19 pages.

Alexander Bukharin and Tuo Zhao. "Data Diversity Matters for Robust Instruction Tuning," https://arxiv.org/abs/2311.14736v2, Feb. 5, 2024, 22 pages.

Fanqi Wan, et al. "EXPLORE-INSTRUCT: Enhancing Domain-Specific Instruction Coverage through Active Exploration," https://arxiv.org/abs/2310.09168v3, Oct. 24, 2023, 20 pages.

Ning Ding, et al. "Enhancing Chat Language Models by Scaling High-quality Instructional Conversations," https://arxiv.org/abs/2305.14233v1, May 23, 2023, 17 pages.

Yew Ken Chia, et al. "InstructEval: Towards Holistic Evaluation of Instruction-Tuned Large Language Models," https://arxiv.org/abs/2306.04757v3, Jun. 15, 2023, 32 pages.

Kushal Tirumala, et al. "D4: Improving LLM Pretraining via Document De-Duplication and Diversification," https://arxiv.org/abs/2308.12284v1, Aug. 23, 2023, 36 pages.

Sanjay Kumar Anand and Suresh Kumar. "Experimental Comparisons of Clustering Approaches for Data Representation," ACM Computing Surveys, vol. 55, No. 3, Article 45, Mar. 2022, 33 pages.

Shallu Sharma and Pravat Kumar Mandal. "A Comprehensive Report on Machine Learning-based Early Detection of Alzheimer's Disease using Multi-modal Neuroimaging Data," ACM Computing Surveys, vol. 55, No. 2, Article 43, Mar. 2022, 44 pages. Retrieved from https://www.researchgate.net/publication/356404737.

Fadi Thabtah, et al. "Data imbalance in classification: Experimental evaluation," Information Sciences, vol. 513, Mar. 2020, pp. 429-441.

Zekai Chen, et al. "Language Models Are Few-shot Learners for Prognostic Prediction," https://arxiv.org/abs/2302.12692v4, May 4, 2023, 9 pages.

Hugo Touvron, et al. LLAMA 2: Open Foundation and Fine-Tuned Chat Models, https://arxiv.org/abs/2307.09288v2, Jul. 19, 2023, 25 pages.

John Joon Young Chung, et al. "Increasing Diversity While Maintaining Accuracy: Text Data Generation with Large Language Models and Human Interventions," https://arxiv.org/abs/2306.04140v1, Jun. 7, 2023, 17 pages.

Dan Friedman and Adji Bousso Dieng. "The Vendi Score: A Diversity Evaluation Metric for Machine Learning," https://arxiv.org/abs/2210.02410v2, Jul. 2, 2023, 32 pages.

Muhammad Ferjad Naeem, et al. "Reliable Fidelity and Diversity Metrics for Generative Models," https://arxiv.org/abs/2002.09797v2, Jun. 28, 2020, 10 pages.

Non-Final Office Action for U.S. Appl. No. 18/621,732, mailed on Dec. 18, 2025, 21 pages.

* cited by examiner

DATA-DIVERSITY METRICS FOR MODEL TRAINING DATA

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Such processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
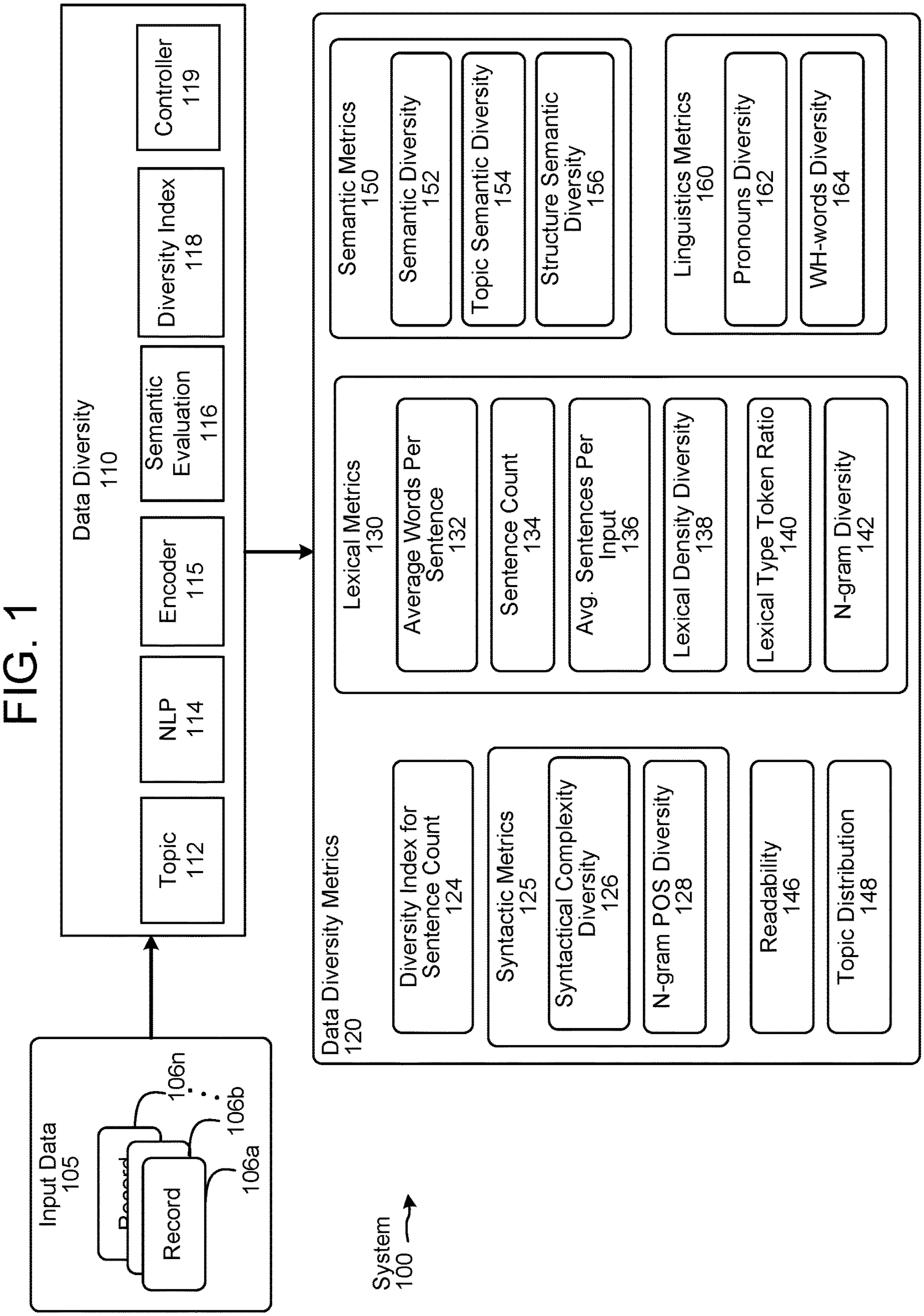
FIG. 1 is a conceptual diagram illustrating example components and processing of a system for determining data diversity metrics corresponding to input data, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. Speech-to-speech is a field of computer science, artificial intelligence, and linguistics in which embedding data is generated to represent speech in audio data and, using one or more models, the embedding data is processed to generate audio data and/or a system command (e.g., an API call) responsive to the speech.

Language modeling is the use of various statistical and probabilistic techniques to determine the probability of a given sequence of words occurring in a sentence. Language models analyze bodies of text data to provide a basis for their word predictions. The language models are generative models. In some embodiments, one or more of the language models may be a large language model (LLM). A language model (e.g., LLM) is an advanced artificial intelligence system designed to process, understand, and generate human-like text based on relatively large amounts of data. In some embodiments, a language model (or another type of generative model) may be further designed to process, understand, and/or generate multi-modal data including audio, text, image, and/or video. A language model may be built using deep learning techniques, such as neural networks, and may be trained on extensive datasets that include text (or other type of data, such as multi-modal data including text, audio, image, video, etc.) from a broad range of sources, such as old/permitted books and websites, for natural language processing. An LLM uses an expansive training dataset, as compared to a relatively smaller language model, and can include a relatively large number of parameters (in the range of billions, trillions or more), hence, they are called "large" language models. In some embodiments one or more of the language models (and their corresponding operations, discussed herein below) may be the same language model.

An artificial intelligence (AI) system may use ASR, NLU, NLG, and/or TTS, each with and/or without a language model, for processing user inputs, including natural language inputs (e.g., typed and spoken inputs) and other type of inputs (e.g., inputs not received from a user, inputs received from a system component, inputs representing occurrence of events, etc.).

In some embodiments (e.g., where one or more of the language models are LLMs), the one or more language models may be transformer-based seq2seq models involving an encoder-decoder architecture. In an encoder-decoder architecture, the encoder may produce a representation of an input (e.g., audio, text, image, video, etc.) using a bidirectional encoding, and the decoder may use that representation to perform some task. In some such embodiments, one or more of the language models may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model may be pre-trained for approximately 1 trillion tokens. Being trained on CLM tasks, the one or more language models may be capable of in-context learning. Example of such language models includes Amazon Alexa and Amazon Web Services (AWS) Titan family of generative models.

In other embodiments (e.g., where one or more of the language models are an LLM), the one or more language models may be a decoder-only architecture. The decoder-only architecture may use left-to-right (unidirectional) encoding of the input (e.g., audio, text, image, video, etc.). Examples of such language models include others in the Amazon Alexa and AWS Titan family of models as well as the Generative Pre-trained Transformer 3 (GPT-3) and other versions of GPT. GPT-3 reportedly has a capacity of (approximately) 175 billion machine learning parameters.

Other examples of language models (e.g., LLMs) include BigScience Large Open-science Open-access Multilingual Language Model (BLOOM), Language Model for Dialogue Applications model (LaMDA), Bard, Large Language Model Meta AI (LLaMA), etc.

In some embodiments, the system may include one or more machine learning models instead of or in addition to the language model(s). Such machine learning model(s) may receive text and/or other types of data as inputs (e.g., audio, image, video, etc.), and may output text and/or the other types of data. Such model(s) may be neural network-based models, deep learning models, classifier models, autoregressive models, seq2seq models, etc.

In some embodiments, the input to the language model may be in the form of a prompt. A prompt may be a natural language input, for example, a directive or request, for the language model to generate an output according to the prompt. The output generated by the language model may be a natural language output responsive to the prompt. In some embodiments, the output may additionally or instead be another type of data, such as audio, image, video, etc. The prompt and the output may be text in a particular language (e.g., English, Spanish, German, etc.). For example, for an example prompt "how do I cook rice?", the language model may output a recipe (e.g., a step-by-step process represented by text, audio, image, video, etc.) to cook rice. As another example, for an example prompt "I am hungry. What restaurants in the area are open?", the language model may output a list of restaurants near the user that are open at the time of the user prompt.

Various machine learning techniques may be used to train and operate models to perform various steps described herein. For example, in some embodiments, the language models may be configured using few-shot learning. In few-shot learning, the model learns how to learn to solve the given problem. In this approach, the model is provided with (e.g., in the prompt) a limited number of examples (i.e., "few shots") from the new task, and the model uses this information to adapt and perform well on that task. Few-shot learning may require less training data than implementing other fine-tuning techniques. For further example, in some embodiments, the language models may be configured using one-shot learning, which is similar to few-shot learning, except the model is provided with a single example (e.g., in the prompt). As another example, in some embodiments, the language models may be configured using zero-shot learning. In zero-shot learning, the model solves the given problem without examples of how to solve the specific/similar problem and just based on the model's training dataset. In this approach, the model is provided with data not observed during training, and the model learns to generate an appropriate output based on its learning of other data.

Trained models may be configured to perform other various tasks, such as automatic speech recognition, user recognition, sentiment detection, image processing, dialog management, etc. Models may be trained and operated according to various other/additional techniques. Such techniques may include, for example, neural networks (such as deep neural networks, recurrent neural networks, convolutional neural networks, etc.), inference engines, trained classifiers, etc. Examples of trained classifiers include Support Vector Machines (SVMs), neural networks, decision trees, AdaBoost (short for "Adaptive Boosting") combined with decision trees, and random forests. For example, a supervised learning model may use learning algorithms that analyze data and recognize patterns in the data, and which are commonly used for classification and regression analysis. Given a set of training examples, each marked as belonging to one of two categories, a training algorithm builds a model that assigns new examples into one category or the other. Other models may be built with the training set identifying more than two categories. A trained model may be mapped so that the examples of the separate categories are divided by clear gaps. New examples/inputs are then mapped into that same space by the trained model and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component can require establishing a "ground truth" for the training examples. In machine learning, the term "ground truth" refers to the accuracy of a training set's classification for supervised learning techniques. Various other/additional techniques may be used to train the models including backpropagation, statistical learning, supervised learning, semi-supervised learning, stochastic learning, finetuning, reinforcement learning, feedback based learning, or other known techniques.

The present disclosure relates to, among other things, techniques for determining diversity metrics for data that can be used for model training (including "pre-training" and "fine-tuning" foundation models). Such metrics may be used to measure the diversity of training data with respect to other training data to avoid a model being trained using data that is too homogeneous and to result in a model sufficiently robust to process input data having different characteristics and to generate responses having different characteristics. The present disclosure also describes, among other things, techniques for using the data diversity metrics to determine training data for a model. In some embodiments, the training data can be determined from a larger dataset based on the data diversity metrics. In some embodiments, a sample training input can be evaluated with respect to a training dataset for diversity metrics and feedback regarding the sample training input can be provided.

The techniques described herein can be used to determine data diversity metrics for input data, which can include a single training sample, multiple training samples, multiple training datasets, etc. In some embodiments, the data diversity metrics include syntactic metrics, lexical metrics, readability metrics, topic metrics, semantic metrics, linguistic metrics, and/or metrics that measure other aspects of the data. In some embodiments, a system may employ improved or new techniques for determining the data diversity metrics. The system may process input data that may be an individual record, where the record may include a single sentence, two or more sentences, multiple sentences making up a paragraph, a dialog between a user(s) and a system, a dialog between two or more users, etc. In some cases, the input data may be a dataset including a group of the individual records, a group of same type of records (e.g., multiple dialogs), a group of different types of records (e.g., dialogs, informational paragraphs), etc. An individual record or dataset comprising multiple records may be used to train a model. Some of the data diversity metrics may correspond to an individual record. For example, a topic, sentence count, word count, pronoun diversity or others may be determined on a record-basis. Others of the data diversity metrics may correspond to two or more records or a dataset. For example, topic diversity, semantic diversity, lexical diversity or others may be determined based on two or more records (e.g., whether a first record is semantically diverse than a second record).

In some embodiments, a record, included in the input data, may include different types of data (e.g., a multi-modal record), such as text data, image data, audio data, sensor data or other type of data. Sensor data may indicate user or object movement, environmental conditions (e.g., temperature, humidity, etc.), and the like. The techniques described herein may be used to determine diversity using multi-modal records, where the diversity metrics may be based on a comparison of like type of data (e.g., comparison of image data included in the records, comparison of audio data included in the records, etc.) and/or based on a comparison of different type of data (e.g., comparison of image data and audio data included in a record or multiple records).

In some embodiments, the data diversity metrics are used for data quality evaluation that can facilitate selection of data for model training. Selection can produce training datasets that are diverse. Selection can also be made to produce a training dataset having a particular characteristic (e.g., data related to a particular topic, data related to a particular sentence structure, etc.). The system of the present disclosure can help model developers to obtain metrics for their training data, so that they can make an informed selection of data to train a model instead of using any or all available data for model training in a less selective manner (which can increase computational and time costs, result in poor model performance, etc.).

In some embodiments, a system may receive and process a large number of datasets to determine corresponding data diversity metrics. Some of the data diversity metrics may be associated with individual records in the datasets, while others of the data diversity metrics may be associated with individual datasets. A user, such as a model developer, data scientist, etc., or a system component (e.g., an automated model training system) can provide inputs to filter and/or sample data from the datasets based on the data diversity metrics. For example, the user may provide an input to sample data related to a particular topic and the system may output data, from the datasets, corresponding to the topic based on the data diversity metrics. As another example, the user may provide an input to filter out data that is not lexically diverse and the system may output data, from the datasets, including lexically diverse records. As yet another example, the user may provide an input to sample a dataset that is semantically diverse and the system may output the dataset, from the large number of datasets, that is semantically diverse. The user can use the selected/outputted data to train (e.g., initial training, updating, fine-tuning, etc.) a model. Based on the model performance after training, the user can select further training data based on the data diversity metrics.

In some embodiments, the data diversity metrics can be used to evaluate a sample input provided by a user (e.g., a human annotator, a data scientist, a model developer, etc.) to determine whether the sample input satisfies certain criteria related to data diversity. A system may receive the sample input and a training dataset that is to be used to train a model. The system may determine data diversity metrics corresponding to the sample input in view of the training dataset. Based on the determined data diversity metrics, the system may provide feedback related to the sample input and based on the feedback, the sample input may be used for model training or the user may provide another sample input. For example, based on the data diversity metrics, the system may determine that the sample input is not semantically diverse from the training dataset records, the system may output feedback representing that the sample input is not semantically diverse, and the user may provide another sample input that is potentially semantically diverse from the training dataset. As another example, the system may determine that the sample input is topically diverse from the training dataset and may include the sample input in the training dataset to be used train the model. As a further example, the system may output feedback representing that the sample input is topically diverse and the user may provide further sample inputs related to the same/similar topic.

Teachings of the present disclosure provide, among other things, improved techniques for evaluating training data for data diversity quality. Using the data diversity metrics, model developers can select a smaller size of training data having better quality and diversity. This can help reduce computational costs (via use of lesser training data), save time (by using the system to select the training data), and improve model performance (by selecting high quality diverse training data). For example, in some cases, model developers used 50% less training data based on the data diversity metrics and the models yield better performance even with half of the training data.

In some embodiments, the techniques herein provide new metrics for evaluating training data, such as topic distribution (using a topic determination model trained on a large number of topic clusters (e.g., 500 clusters)), pairwise sentence structure semantic measure and pairwise topic semantic measure. In some embodiments, the techniques herein provide modifications or extensions to metrics that are usually used in other fields/technology to be adapted for evaluating training data, such as use of the Shannon Diversity Index to determine statistical distributions of linguistic metrics (e.g., sentence count, pronouns, WH-words, etc.). In some embodiments, the techniques herein provide introduction of metrics used in other fields to evaluate training data, such as Flesch-Kincaid Readability test, which is usually used to evaluate students' reading scores.

Techniques described herein relate to determining innovative and improved data diversity metrics, using the data diversity metrics to enable selection of high quality diverse training data and using the data diversity metrics to guide generation of training data.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a conceptual diagram illustrating example components and processing of a system 100 for determining data diversity metrics corresponding to input data, according to embodiments of the present disclosure. The system 100 may include a data diversity component 110 configured to process input data 105 and generate various data diversity metrics 120 corresponding to the input data 105.

In some embodiments, the input data 105 may be a single record 106 (representing a potential training sample), where the record 106 be a single sentence, two or more sentences, multiple sentences making up a paragraph, a dialog between a user(s) and a system, a dialog between two or more users, etc. In some embodiments, the input data 105 may be a group of records 106*a*-106*n*, a group of same type of records or a group of different types of records. For example, the input data 105 may be a training dataset including multiple records 106, where each record may be one of the individual records described above. For example, the training dataset may include multiple single sentences, multiple two or more sentences, multiple paragraphs, multiple dialogs, etc. In non-limiting examples, the input data 105 may include over 1000 records.

In some cases, the data diversity component 110 may evaluate a single record 106 included in the input data 105 to determine data diversity metrics 120 corresponding to the single record 106. In some cases, the data diversity component 110 may evaluate multiple records 106*a*-106*n* included in the input data 105 to determine data diversity metrics 120 corresponding to the multiple records. In such cases, the data diversity metrics 120 may represent individual data diversity metrics corresponding to each record and/or the data diversity metrics 120 may represent aggregated results corresponding to the multiple records.

In some cases, the data diversity component 110 may determine the data diversity metrics 120 based on evaluating a record 106*a* in view of one or more of the other records 106*b*-106*n* included in the input data 105. For example, the data diversity metrics 120 may represent a metric corresponding to an individual record based on its comparison to one or more other records in the input data 105.

The data diversity component 110 may be configured to use one or more techniques to determine the data diversity metrics 120. In example embodiments, the data diversity component 110 may include a topic component 112, a natural language processing (NLP) component 114, an encoder 115, a semantic evaluation component 116 and a diversity index component 118.

The topic component 112 may be configured to use one or more topic determination techniques to determine a topic corresponding to a particular record 106 or group of records. In some embodiments, the topic component 112 may include a trained model. In some embodiments, the trained model may be configured using unsupervised learning and using a large dataset including text relating to multiple different topics (e.g., 500 topic clusters). The trained model may be based on an unsupervised topic modeling technique that leverages transformers and c-TF-IDF (class term frequency-inverse document frequency) approaches to create dense clusters allowing for easily interpretable topics whilst keeping important words in the topic descriptions. The trained model may be configured using diverse datasets to capture comprehensive topics, and then the trained model may be used to predict the topic of an input/record 106.

In some embodiments, the topic component 112 may be configured to summarize a topic of an input record(s) 106 and may use topic summarization techniques including but not limited to a language model configured for topic summarization.

The NLP component 114 may be configured to use one or more NLP techniques including but not limited to text parsing, parts-of-sentence (POS) tagging, named entity recognition (NER), etc. The NLP component 114 may also be configured to perform certain counting techniques for determine a count for an input, such as sentence count, word count, word type count, pronoun count, etc.

The encoder 115 may be configured to generate an embedding or other representation data for an input (e.g., a text embedding, a word embedding, a sentence embedding, etc.). In some embodiments, the encoder 115 may be Task2Vec encoder, a language model (e.g., a BERT (bidirectional encoder representations from transformers) model), etc.

The semantic evaluation component 116 may be configured to determine a semantic measure between two or more inputs. The semantic measure may represent a similarity (or difference) between two or more inputs. For natural language inputs, the semantic measure may represent a meaning similarity (or meaning difference). The semantic measure may be a value, where some values may indicate that the inputs are similar while other values may indicate that the inputs are different. For example, a semantic measure satisfying a first condition (e.g., a similarity condition representing a range of values (e.g., between 0-0.5 or 0.5-1) for semantic similarity) may represent that two inputs are semantically similar. As further example, a semantic measure satisfying a second condition (e.g., a difference condition representing a range of values (e.g., between 0.5-1 or 0-0.5) for semantic difference) may represent that two inputs are semantically different. Depending on system configurations, in example embodiments, a higher semantic measure may represent inputs are similar while lower semantic measure may represent inputs are different, while in other example embodiments, a lower semantic measure may represent inputs are similar while higher semantic measure may represent inputs are different.

In some embodiments, the semantic evaluation component 116 may use embeddings, determined, for example, by the encoder 115, corresponding to the inputs and may determine the semantic measure based on a cosine distance measurement of the embeddings.

The diversity index component 118 may be configured to determine a Shannon Diversity Index or Shannon Equitability Index, as known in the art, for an input(s). In other embodiments, the diversity index component 118 may determine a different type of diversity index or may use a different mechanism to determine a diversity index representing how diverse a group of inputs are. The Shannon Diversity Index (sometimes called the Shannon-Wiener Index) is way to measure the diversity of species in a community/dataset. Denoted as H, the index is calculated as:

$$H = \sum p_i * \ln(p_i)$$

where $p_i$ is the proportion of the entire community made up of species i. The higher the value of H, the higher the diversity of species in a particular community. The lower the value of H, the lower the diversity. A value of H=0 indicates a community that only has one species.

The Shannon Equitability Index is a way to measure the evenness of species in a community. The term "evenness" may refer to how similar the abundances of different species are in the community. Denoted as $E_H$ the index is calculated as:

$$E_H = \frac{H}{\ln(S)}$$

where H is the Shannon Diversity Index and S is the total number of unique species.

Further details on how the components 112, 114, 115, 116 and 118 may be used to determine one or more of the data diversity metrics 120 are described below.

Described below are examples individual metrics that may be included in the data diversity metrics 120. The data diversity metrics 120 may be one or more of the below individual metrics or a combination of two or more of the below individual metrics.

In example embodiments, one data diversity metric may be a sentence count representing a number of sentences in an individual record of the input data 105. The data diversity metrics 120 may include a value representing the number of sentences. The data diversity component may use a technique to count the number of sentences (e.g., using the NLP component 114). In example embodiments, one data diversity metric may be a diversity index of a sentence count distribution 124 for a group of records of the input data 105 (e.g., a Shannon Diversity Index). The data diversity metric 120 may include a value (e.g., ranging from and inclusive of the endpoints 0 to 1; 0 to 10; 0 to 100; etc.) corresponding to the diversity index for sentence count distribution, where, in some examples, a value of "0" may indicate a low sentence count diversity (e.g., many of the records have the same or similar number of sentences) while a value of "1" may indicate a high sentence count diversity (e.g., the records have a varied number of sentences). A varied number of sentences within a training sample may help the model to learn to generate outputs of varying number of sentences.

In example embodiments, the data diversity metrics 120 may include syntactic metrics 125, which may collectively refer to syntactical complexity metric 126 and N-gram parts-of-sentence (POS) diversity metric 128.

The syntactical complexity 126 may be a Boolean value indicating whether or not the dependency relation is adjacent to a token, where a value of "0" or "False" may indicate low syntactic complexity and a value of "1" or "True" may indicate high syntactic complexity. Artificial or machine-based grammar structures often use adjacent dependencies and non-adjacent dependencies to understand a natural language. An adjacent dependency refers to two tokens that are adjacent to one another and related/dependent. A non-adjacent dependency refers to two tokens that are not adjacent to one another and are related/dependent. Various types of non-adjacent dependency may exist based on a number of tokens in between the two dependent tokens and surrounding the dependent tokens. More complex grammars go beyond the requirement to learn a single nonadjacent dependency at a time and require several dependencies to be processed simultaneously.

The N-gram POS (parts-of-sentence) diversity 128 may represent diversity in surface patterns in sentences based on POS tags generated for the sentences and may be based on a ratio of unique n-grams in a corpus n-grams. POS tagging may generate tag portions of a sentence with a its detected function/type (e.g., noun, verb, adjective, adverb, pronoun, article, etc.). The N-gram POS diversity 128 may be based on a N-gram value for which POS diversity is evaluated (e.g., for unigram unique POS distance (N=1), bigram unique POS distance (N=2), trigram unique POS distance (N=3), etc.). The N-gram POS diversity may be a value (e.g., ranging from and inclusive of the endpoints 0 to 1, 0 to 10, 0 to 100, etc.), where a value of "0" may indicate low diversity in POS, while a value of "1" may indicate high diversity in POS. For the N-gram POS diversity metric 128, the data diversity component 110 may use a POS tagging technique (e.g., via the NLP component 114) to convert all words in a record(s) into POS tags then measure the diversity between the POS tags. For an example sentence "I like apples", the POS-tagging version of sentence may be "PRONOUN VERB NOUN". The N-gram POS diversity metric 128 may be a fraction of common POS tag n-grams in two records, with n € [1, 2, 3 . . . ] (i.e., number of matching n-grams in both inputs).

In example embodiments, the data diversity metrics may include lexical metrics 130, which may collectively refer to average words per sentence metric 132, sentence count metric 134, average sentences per input 136, lexical density metric 138, type token ratio metric 140, and N-gram diversity 142.

The average words per sentence metric 132 may be a value representing an average number of words per sentence within a record. The sentence count 134 may be a value representing the number of sentences within a record. The average sentences per input 136 may be a value representing an average number of sentences based on a number of sentences in each record of the input data 105. The data diversity component 110 may use the NLP component 114 (and/or other techniques) to determine the average words per sentence metric 132, the sentence count metric 134 and the average sentences per input 136.

The lexical density diversity metric 138 may refer to a proportion of content words (e.g., nouns, verbs, adjectives, adverbs, etc.) to the total number of words in a record. Text with a lower lexical density may be more easily understood. For example, a lexically dense record may have a lexical density measure of about 60-70% and those which are not lexically dense may have a lower lexical density measure of about 40-50%. The lexical density diversity metric may be a value (e.g., ranging from and inclusive of the endpoints 0 to 1, 0 to 10, 0 to 100, etc.), where a value of "0" may indicate low lexical diversity within the input data 105 (e.g., many of the records have the same or similar lexical density measure), while a value of "1" may indicate high lexically diversity within the input data 105 (e.g., the records have varying lexical density measure).

The lexical type token ratio (TTR) metric 140 may model the relation between the number of unique words and the number of running words (tokens) within a record of the input data 105. The TTR metric may be a value (e.g., ranging from and inclusive of the endpoints 0 to 1, 0 to 10, 0 to 100, etc.), where a value of "0" may indicate low TTR diversity within the input data 105 (e.g., many of the records have the same or similar type token ratio measure), while a value of "1" may indicate high TTR diversity within the input data 105 (e.g., the records have varying type token ratio measures).

In some embodiments, the lexical TTR metric 140 of a record may be determined using a variety of indices. In the following formulas, N refers to the total number of tokens, V to the number of types, and $f_v(i,N)$ to the numbers of types occurring i times in a sample of length N:

$$\text{Ordinary } TTR = \frac{V}{N}$$

$$C \text{ or log } TTR = \frac{\log V}{\log N}$$

$$R \text{ or Root } TTR = \frac{V}{\sqrt{N}}$$

$$CTTR \text{ or Corrected } TTR = \frac{V}{\sqrt{2N}}$$

$$U \text{ or Uber Index} = \frac{(\log N)^2}{\log N - \log V}$$

$$S \text{ or Summer's Index} = \frac{\log\log V}{\log\log N}$$

$$K \text{ or Yule's } K = 10^4 \times \left[-\frac{1}{N} + \sum_{i=1}^{V} f_v(i, N)\left(\frac{i}{N}\right)^2\right]$$

$$I \text{ or Yule's } I = \frac{V^2}{M_2 - V};\ M_2 = \sum_{i=1}^{V} i^2 * f_v(i, N)$$

$$D \text{ or Simpson's } D = \sum_{i=1}^{V} f_v(i, N)\ \frac{i}{N}\ \frac{i-1}{N-1}$$

$$\text{Herdan's } V_m \text{ or } V_m = \sqrt{\sum_{i=1}^{V} f_v(i, N)\left(\frac{i}{N}\right)^2 - \frac{i}{V}}$$

$$\text{Mass Indices: } a^2 = \frac{\log N - \log V}{\log N^2};\ \log V_0 = \frac{\log V}{\sqrt{1 - \frac{\log V^2}{\log N}}}$$

The N-gram diversity metric 142 may represent diversity based on surface patterns in a set of sentences. The N-gram diversity metric may be based on a N-gram value within which patterns may be evaluated (e.g., a unigram proportion of unique words (N=1); a bigram unique distance (N=2); trigram unique distance (N=3); quadrigram unique distance (N=4); etc.). The N-gram diversity metric may be a value ((e.g., ranging from and inclusive of the endpoints 0 to 1, 0 to 10, 0 to 100, etc.), where a value of "0" may indicate low N-gram diversity within the input data 105 (e.g., many of the records have the same or similar type N-gram patterns), while a value of "1" may indicate high N-gram diversity within the input data 105 (e.g., the records have varying types of N-gram patterns).

In example embodiments, one of the data diversity metrics 120 may be a readability metric 146 representing a reading level based on how difficult text in a record is to understand. In some embodiments, the readability metric may be determined using a Flesch-Kincaid readability test. In some cases, the readability metric 146 may be based on a similar technique as used to assess reading levels for students or persons learning to read English (or other natural language). The readability metric may include a value (e.g., ranging from and inclusive of the endpoints 0 to 1, 0 to 10, 0 to 100, etc.), where a value of "0" may indicate low readability and a easy to read record 106, while a value of "1" may indicate high readability and a difficult to read record 106.

In example embodiments, one of the data diversity metrics 120 may be a topic distribution metric 148 for a set of multiple records 106*a-n* of the input data 105 representing how topically diverse the input data 105 is. The data diversity component 110 may determine a topic associated with each record 106 in the input data 105. The topic may be determined using the topic component 112, for example, using the trained model included in the topic component 112. The topic may be determined based on a comparison to all potential topics learned by the trained model and beyond what is included in the input data 105 being evaluated. After determining the topic of each record 106, the data diversity component 110 may determine a diversity index (e.g., using the diversity index component 118) for topic distribution based on the topics for the records 106 in the input data 105.

In some embodiments, the topic distribution 148 may be a measure of topics discussed in the input data 105 (e.g., a percentage of topics covered, a number of topics from the 500 topic clusters that the topic component 112 is trained on, etc.). In some embodiments, the topic distribution 148 may be a measure of topic distribution against a reference distribution (e.g., a flat distribution), where the measure may be determined using KL divergence techniques. In some embodiments, the topic distribution 148 may be a measure of a diversity index, for example a Shannon Diversity Index.

In some embodiments, the data diversity metrics 120 may include topic data (not shown) representing a topic associated with the record 106. The topic data may be a topic determined by the topic component 112 or may be a summary of the record 106 representing the topic.

In example embodiments, the data diversity metrics 120 may include semantic metrics 150, which may collectively refer to semantic diversity metric 152, topic semantic diversity metric 154, and structure semantic diversity metric 156.

The semantic diversity metric 152 may be based on evaluating a pair of records 106 or a group of records 106 and may represent a semantic measure of the evaluated records. In some embodiments, the data diversity component 110 may use the encoder 115 to convert sentences, of a record 106, into embeddings. The embeddings for an individual record 106*a* are evaluated in view of embeddings for another record 106*b* using cosine distance to determine a semantic measure (e.g., using the semantic evaluation component 116). For example, a first sentence embedding for a first sentence may be determined and a second sentence embedding for a second sentence may be determined, the first sentence embedding and the second sentence embedding may be compared using cosine distance to determine how semantically similar the two sentences are. The semantic diversity metric 152 may be a value (e.g., ranging from and inclusive of the endpoints 0 to 1, 0 to 10, 0 to 100, etc.), representing how semantically diverse two or more records are, where a value of "0" may indicate that the records are not semantically diverse (i.e., the records are semantically similar) and a value of "1" may indicate that the records are semantically diverse.

The topic semantic diversity metric 154 may be based on evaluating a pair of records 106 or a group of records 106 and may represent whether the records are semantically diverse in terms of topic. In some embodiments, the data diversity component 110 may determine a summary of a record 106 representing a summarized topic (e.g., using topic summarization techniques including but not limited to using a language model configured for topic summarization, etc.) and may then determine a semantic measure based on the summarized topics of two or more records 106. As such, the summarized topic is based on the information included in the record itself. The semantic measure, in this case, may represent how similar (or different) the summarized topics are in terms of meaning. Similar topics may correspond to a particular semantic measure while different topics may correspond to another semantic measure. The semantic measure may be a value, multiple values or a combination of multiple values, where an individual semantic measure value may correspond to individual sentences/words within the topic summary. In example embodiments, the semantic measure may be determined using embeddings for the summarized topics for the records being evaluate and using cosine distance of the embeddings (e.g., using the encoder 115 and the semantic evaluation component 116). The topic semantic diversity metric 154 may include a value (e.g., ranging from and inclusive of the endpoints 0 to 1, 0 to 10, 0 to 100, etc.), representing how topically diverse two or more records are, where a value of "0" may indicate that the records are not topically diverse (i.e., the records relate to the same or similar topic) and a value of "1" may indicate that the records are topically diverse (i.e., the records relate to different topics).

The structure semantic diversity metric 156 may represent a semantic measure, between a pair of records or a group of records, without regard to a named entity. In some embodiments, the data diversity component 110 may identify a name entity within a record 106 (e.g., using name entity recognition techniques via the NLP component 114), replace the identified name with a placeholder, and evaluate the structure-wise diversity between the records. Structurally diverse sentences, for example, may have different grammatical structures, different POS or different positions of POS, etc. For example, a first sentence with a POS structure of pronoun-verb-noun may be structurally different than a second sentence with a POS structure of noun-verb-pronoun. The structure semantic diversity metric 156 may be a value (e.g., ranging from and inclusive of the endpoints 0 to 1, 0 to 10, 0 to 100, etc.), representing how structurally diverse two or more records are, where a value of "0" may indicate that the records are not structurally diverse and a value of "1" may indicate that the records are structurally diverse.

In example embodiments, the data diversity metrics may include linguistic metrics 160, which may collectively refer to pronouns diversity metric 162 and WH words diversity metric 164.

The pronouns diversity metric 162 may represent diversity with respect to the pronouns used in the record. In some embodiments, the data diversity component 110 may identify the pronouns using, for example, POS tagging techniques, text parsing techniques, natural language processing techniques, etc. (via the NLP component 114), in the record 106 and may then determine a diversity index (e.g., a Shannon Diversity Index) based on the identified pronouns (via the diversity index component 118). The pronouns diversity metric 162 may be a value (e.g., ranging from and inclusive of the endpoints 0 to 1, 0 to 10, 0 to 100, etc.), representing whether the record uses diverse pronouns or not, where a value of "0" may indicate that the record is not diverse with respect to pronouns (e.g., the record includes "he" or other male-referring pronouns) and a value of "1" may indicate that the record is diverse with respect to pronouns (e.g., the record includes "he", "she" or pronouns referring to more than one gender are used).

The WH words diversity metric 164 may represent diversity with respect to the records 106 including questions that begin with what, when, where, who, whom, which, whose, why and how ("WH words"). In some embodiments, the data diversity component 110 may identify the question-beginning words using, for example, POS tagging techniques, text parsing techniques, natural language processing techniques, etc. (via the NLP component 114), in the record and may then determine a diversity index (e.g., a Shannon Diversity Index) based on the identified words (via the diversity index component 118). The WH words diversity metric 164 may be a value (e.g., ranging from and inclusive of the endpoints 0 to 1, 0 to 10, 0 to 100, etc.), representing whether the record uses diverse question-beginning words or not, where a value of "0" may indicate that the record is not diverse with respect to Wh-words (e.g., the record includes one or two of the same WH words) and a value of "1" may indicate that the record is diverse with respect to Wh-words (e.g., the record includes a variety of WH words).

In some embodiments, the data diversity component 110 may determine a dialog turn count for the record 106 that includes a dialog. The data diversity component 110 may further determine a diversity index (e.g., a Shannon Diversity Index) for dialog turn count for records 106 that include dialogs, where such metric can be used to determine whether or not the input data 105 includes dialogs of varying turns/lengths. For records 106 that do not include a dialog, the dialog turn count may be 1.

In some embodiments, the data diversity component 110 may include a controller component 119 configured to execute one or more techniques to determine one or more of the data diversity metrics 120. The controller component 119 may send requests to perform an action(s) and data to be used to perform the action(s) to one or more of the topic component 112, the NLP component 114, the encoder 115, the semantic evaluation component 116, and the diversity index component 118. The controller component 119 may receive data from the foregoing components, where the data may be determined based on performance of the requested action(s). In some embodiments, the controller component 119 may cause the components to execute to determine all of the data diversity metrics 120 (e.g., in a default operating case). In some embodiments, the controller component 119 may cause the components to execute to determine some of the data diversity metrics 120 based on, for example, a received input indicating certain metrics or conditions are of interest. The input may be received from a user, such as a model developer, system administrator, researcher, etc. or from a system component, such as an automated model training system, etc. In some embodiments, the controller component 119 may cause the components to execute to determine some of the data diversity metrics 120 based on the type of data included in the input data 105.

Figure 2:
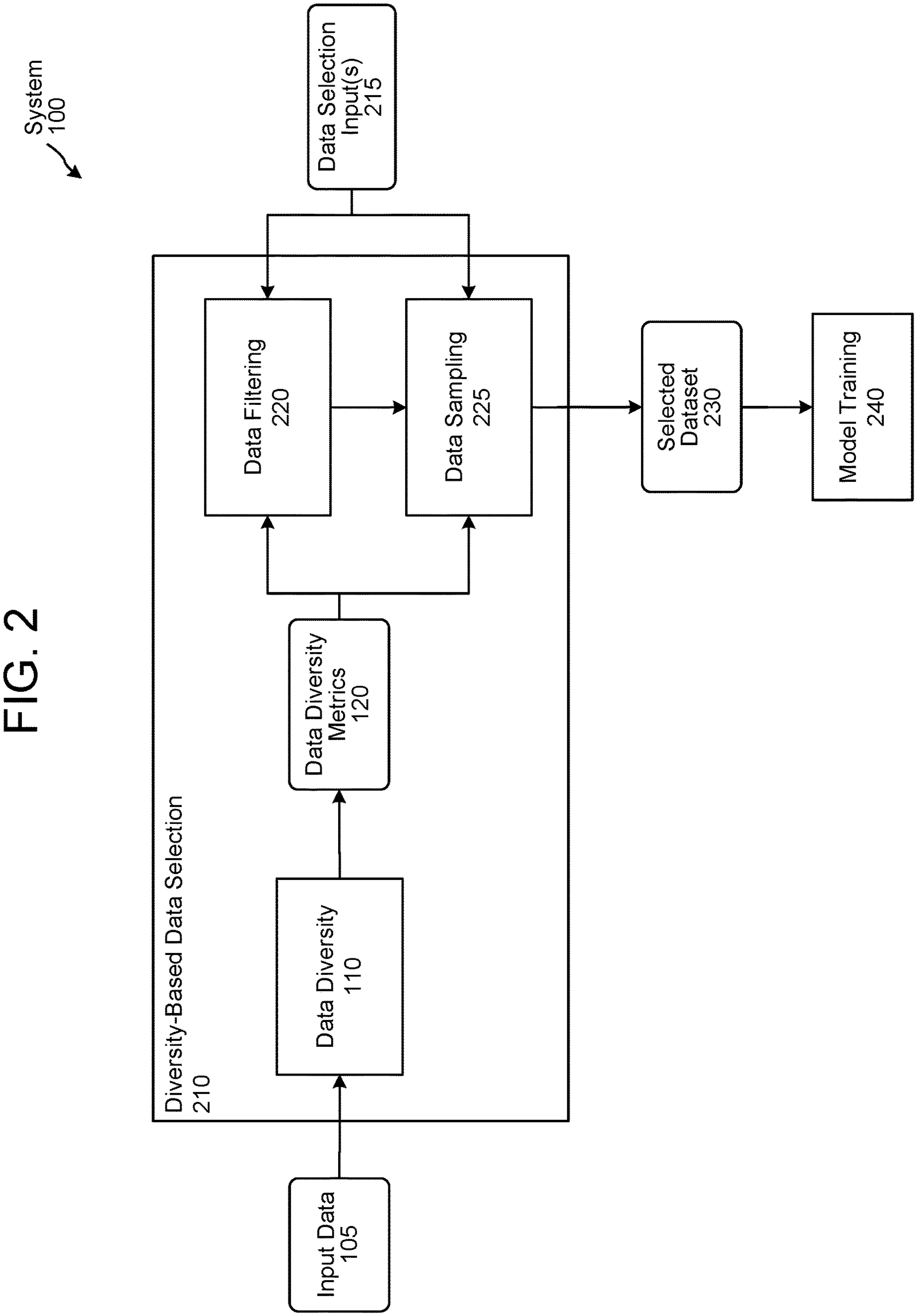
FIG. 2 is a conceptual diagram illustrating example components and processing of a diversity-based data selection component, according to embodiments of the present disclosure.

FIG. 2 is a conceptual diagram illustrating example components and processing of a diversity-based data selection component 210, according to embodiments of the present disclosure. The diversity-based data selection component 210 may receive the input data 105. In some cases, the input data 105 may include multiple datasets (e.g., a dataset including multiple records 106), each including potential training samples for a model. The data diversity component 110 may process the input data 105 to determine corresponding data diversity metrics 120. The data diversity metrics

120 may include one or more of the various metrics described in relation to FIG. 1.

In some embodiments, the input data 105 may include past interaction data representing at least past user inputs (and optionally corresponding past system responses) received by a system (e.g., the system component(s) 820). The data diversity metrics 120 may be determined for past interaction data to determine diverse characteristics of user inputs. Past interaction data, in some cases, may be used to generate training data to, for example, retrain a model(s) to better respond to user inputs that the system usually receives or has been receiving in a given time period (e.g., last 30 days, last 3 months, etc.).

The data diversity metrics 120 may include some metrics corresponding to individual records 106 in the input data 105 and other metrics corresponding to a dataset including a group of records 106. For example, the data diversity metrics 120 may include a topic distribution metric 148 for each individual record 106 representing, for example, a topic of a paragraph, a topic of a dialog, etc. As a further example, the data diversity metrics 120 may include a topic semantic diversity 154 for a dataset or multiple records representing, for example, how diverse in terms of topic the dataset/multiple records are. The metrics may be associated with the record 106 (or the dataset/group of records 106*a-n*) or with an identifier of the record 106 (or the dataset/group of records 106*a-n*), for example, a record id, a dataset id, etc.

In some embodiments, the diversity-based data selection component 210 may include a data filtering component 220 and a data sampling component 225, each of which may receive the data diversity metrics 120 and the input data 105 (if not already included in the data diversity metrics 120). The data filtering component 220 may be configured to exclude, rearrange, or apportion the input data 105 according to certain criteria, which may be specified in a data selection input(s) 215. The data sampling component 225 may be configured to select a subset of the input data 105 according to certain criteria, which may be specified in the data selection input(s) 215.

Using the diversity-based data selection component 210, users, such as model developers, data scientists, researchers, etc. can evaluate a large number of datasets (included in the input data 105) curated from different data sources. The data diversity component 110 can provide comprehensive data diversity metrics with respect to the large number of datasets. The users can provide one or more data selection inputs 215 to select data, from the input data 105, based on the data diversity metrics 120. The user may provide the data selection input(s) 215 via a user interface displayed at a device (e.g., a device 810).

In some embodiments, the data filtering component 220 may apply certain automatic/pre-defined filtering thresholds to remove data, from the input data 105, that fails to satisfy a condition(s) relating to, for example, data diversity. In some embodiments, the data filtering component 220 may apply a condition(s) specified in the data selection input(s) 215 to filter the input data 105. For example, the data selection input 215 may include a filtering condition indicating that records having a low pronoun diversity metric 162 is to be filtered/excluded and the data filtering component 220 may remove records 106 associated with a low pronoun diversity metric 162. The filtered input data 105 may be provided to the data sampling component 225.

The data sampling component 225 may enable sampling from large datasets based on the data diversity metrics 120. The data sampling component 225 may sample data from the input data 105 or the filtered input data 105 based on the data selection input(s) 215 indicating a condition(s) for sampling. For example, the data selection input 215 may indicate a sampling condition of a particular topic and the data sampling component 225 may determine the records 106, from the input data 105, that are associated with the particular topic. As another example, the data selection input 215 may indicate a sampling condition of high structure semantic diversity 156 and the data sampling component 225 may select one or more datasets associated with high structure semantic diversity. The selected records 106/dataset(s) may be outputted as selected dataset 230.

In some embodiments, the data sampling component 225 may employ statistical algorithms to determine a sample size and sample distribution. In some embodiments, the data sampling component 225 may apply stratified sampling techniques to ensure data completeness covering various dimensions (e.g., topics, lexical metrics, semantic metrics, etc.). The stratified sampling techniques may be applied automatically or in response to the data selection input 215 from a user. In some embodiments, the data sampling component 225 may apply random sampling techniques, systematic sampling techniques, convenience sampling techniques or cluster sampling techniques to determine data/records to include in the selected dataset 230.

In some embodiments, a user may provide the data selection inputs 215 via a user interface. The data selection inputs 215 may be a text input, where the user can type in the filtering condition(s) and/or the sampling condition(s). In other cases, the data selection inputs 215 may be by selection of GUI elements (e.g., checkboxes, radio buttons, drop boxes, etc.). For example, the user interface may present various filtering conditions and sampling conditions that the user can choose (e.g., based on the various data diversity metrics 120) and the user may enter inputs selecting the presented conditions. For example, the user interface may present the topics associated with the input data 105 (as included in the topic distribution metric 148) and the user can select a particular topic for which training data is desired.

In some embodiments, the data selection inputs 215 can indicate a level or threshold (e.g., a numerical value, a scale, etc.) of diversity for particular data diversity metrics 120 (e.g., high level for pronoun diversity, 0.5 value for lexical density diversity, low level for structure semantic diversity, etc.).

The selected dataset 230 may be used by a model training component 240 to train a model. The model training component 240 may be configured to perform initial model training steps (e.g., pretraining of a model, initial training of a model, etc.). The model training component 240 may also be configured to perform finetuning steps, re-training/updating steps, etc. The model training component 240 may be configured to perform one or more types of learning techniques, such as supervised learning, semi-supervised learning, unsupervised learning, etc.

The user (e.g., model developer, data scientist, researcher, etc.) or a system component can evaluate the trained model's performance (trained on the selected dataset 230) and can provide further data selection input(s) 215 to obtain further selected dataset 230 for model training and may continue this process until desired model performance is reached. A model trained on diverse training data can result in better model performance.

In this manner, the data diversity metrics 120 can be used to improve training data selection in terms of computational resources, time and quality. The system enables selection of training data having diverse characteristics or training data associated with a particular characteristic(s). For example, training data related to a particular topic or having a particular sentence structure can be selected to train a model for a particular task.

The data diversity metrics 120 may be used to determine training data for one or more of the models described herein, including but not limited to, task determination language model 920, task selection language model 940, shortlister language model 1040, response language model 1120, ASR component 1250, user recognition component 1295, system directed detector 1285, TTS component 1256, and personalized context component 865. In some embodiments, the diversity-based data selection component 210 may be used to determine training data for finetuning a pre-trained language model for one or more tasks described herein.

In example embodiments, the diversity-based data selection component 210 may be provided as an Amazon Web Service (AWS) function, where a user can provide the input data 105, the AWS function may determine the data diversity metrics 120, the user may provide the data selection input(s) 215, and the AWS function may output the selected dataset 230.

Figure 3:
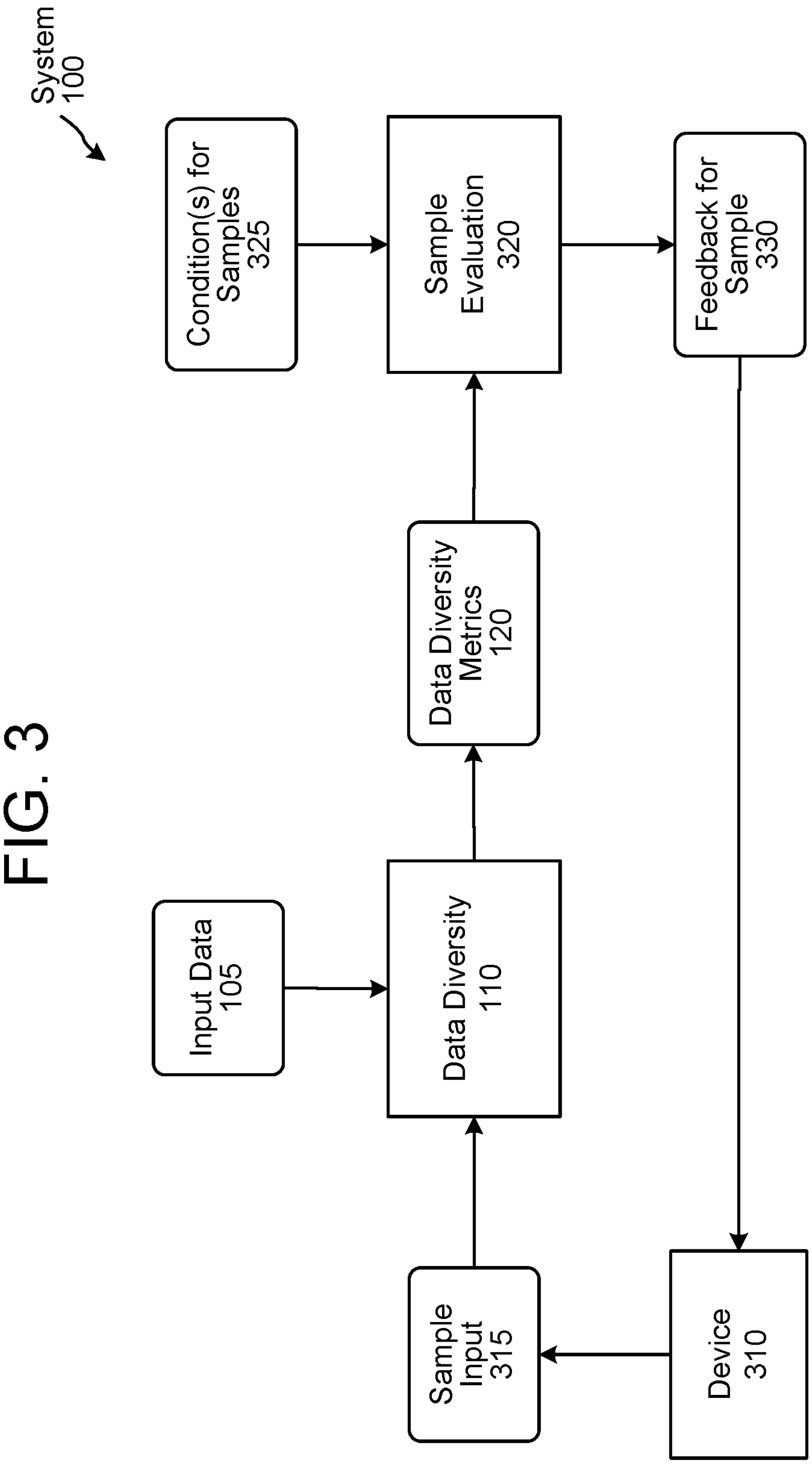
FIG. 3 is a conceptual diagram illustrating example components and processing for evaluating sample input(s) for data diversity, according to embodiments of the present disclosure.

FIG. 3 is a conceptual diagram illustrating example components and processing for evaluating sample input(s) 315 for data diversity, according to embodiments of the present disclosure. In some embodiments, the system 100 may receive the sample input 315 from a device 310 (which may include similar components as device 810) operated by a user, for example, an annotator for labeling or manually generating training samples, a model developer, a data scientist, a researcher, etc. The sample input 315 may be a single sentence, two or more sentences, one or more paragraphs, a dialog between a user(s) and a system, a dialog between two or more users, etc. The sample input 315 may be considered as a single input or single record. In other cases, the sample input 315 may include multiple inputs/records.

The sample input 315 may be processed by the data diversity component 110. The data diversity component 110 may also receive the input data 105 (or similar data) representing a training dataset(s) to be used for model training. The data diversity component 110 may generate some of the data diversity metrics 120 based on processing the sample input 315 in view of the input data 105.

In some cases, the data diversity metrics 120 may include some metrics corresponding to the sample input 315 itself, for example, readability 146, topic distribution 148, etc. In some cases, the data diversity metrics 120 may include other metrics corresponding to the sample input 315 in view of the input data 105, for example, semantic diversity 152, topic semantic diversity 154, structure semantic diversity 156, etc. For example, the data diversity metrics 120 corresponding to the sample input 315 may indicate whether or not the sample input 315 is topically diverse from the input data 105, whether or not the sample input 315 is semantically diverse from the input data 105, etc.

The system 100 may include a sample evaluation component 320 configured to provide feedback with respect to the sample input 315. The sample evaluation component 320 may process the data diversity metrics 120, corresponding to the sample input 315, in view of a condition(s) for samples 325 to determine feedback for sample 330. The condition(s) for samples 325 may be provided by a model developer, data scientist, researcher, etc. and may represent conditions for training samples to satisfy to be used for model training. The conditions for samples 325 may include one or more condition relating to one or more of the data diversity metrics 120. The conditions for samples 325 may include a level (e.g., a numerical value, a scale, etc.) for a particular data diversity metric. For example, the conditions for samples 325 may indicate that new/inputted training samples, for example the sample input 315, are to be topically diverse from the input data 105 (the existing training data/samples), are to be semantically diverse, are to be easy to read (e.g., low readability level 146), etc.

The sample evaluation component 320 may process the data diversity metrics 120 in view of the condition(s) for samples 325 (e.g., the sample evaluation component 320 may compare the data diversity metrics 120 with the condition(s) for samples 325) to determine the feedback for sample 330. The feedback for sample 330 may be based on whether or not the data diversity metrics 120 satisfy the condition(s) for samples 325. In some embodiments, the feedback for sample 330 may be text data or other natural language representation data. The sample evaluation component 320 may also determine an action or a type of sample inputs to suggest/recommend to the user of the device 310. In some cases, the feedback for sample 330 may indicate one or more conditions for samples 325 that the sample input 315 fails to satisfy and the suggested action or sample inputs may be based on the conditions not being satisfy. For example, the feedback for sample 330 may be "The sample input is not topically diverse. Please provide a different sample." Or "The sample input is not diverse in terms of pronouns. Please use multiple pronouns in the sample input." In other cases, the feedback for sample 330 may indicate one or more conditions for samples 325 that the sample input 315 satisfies and the suggested action or sample inputs may be based on the conditions being satisfied. For example, the feedback for sample 330 may be "The sample input is structurally diverse. Please provide more similar samples."

In some embodiments, the feedback for sample 330 may include more information based on the data diversity metrics 120. For example, the sample evaluation component 320 may determine one or more topics associated with the input data 105 (based on the topic distribution metric 148) and may include the topic(s) in the feedback for sample 330 to inform the user of the topics already included in the training dataset so that the user can provide sample inputs for different topics or sample inputs for the same topics. As another example, the sample evaluation component 320 may determine one or more readability levels associated with the input data 105 (based on the readability metric 146) and may include the readability levels in the feedback for sample 330 so that the user can provide sample inputs for different readability levels or same/similar readability levels.

In this manner, the system can guide manual generation of sample inputs by providing feedback with respect to a sample input and/or suggestions for further sample inputs. The guidance can be based on an existing training dataset and to satisfy desired data diversity metrics for model training. A model developer, data scientist, researcher, etc. may specify the criteria that training samples are to satisfy and the system can automatically evaluate the sample inputs and provide corresponding feedback. In this manner, the system can reduce the time it may take to develop a training dataset (e.g., using manual annotation) and can facilitate generation of high quality diverse training data.

Figure 4:
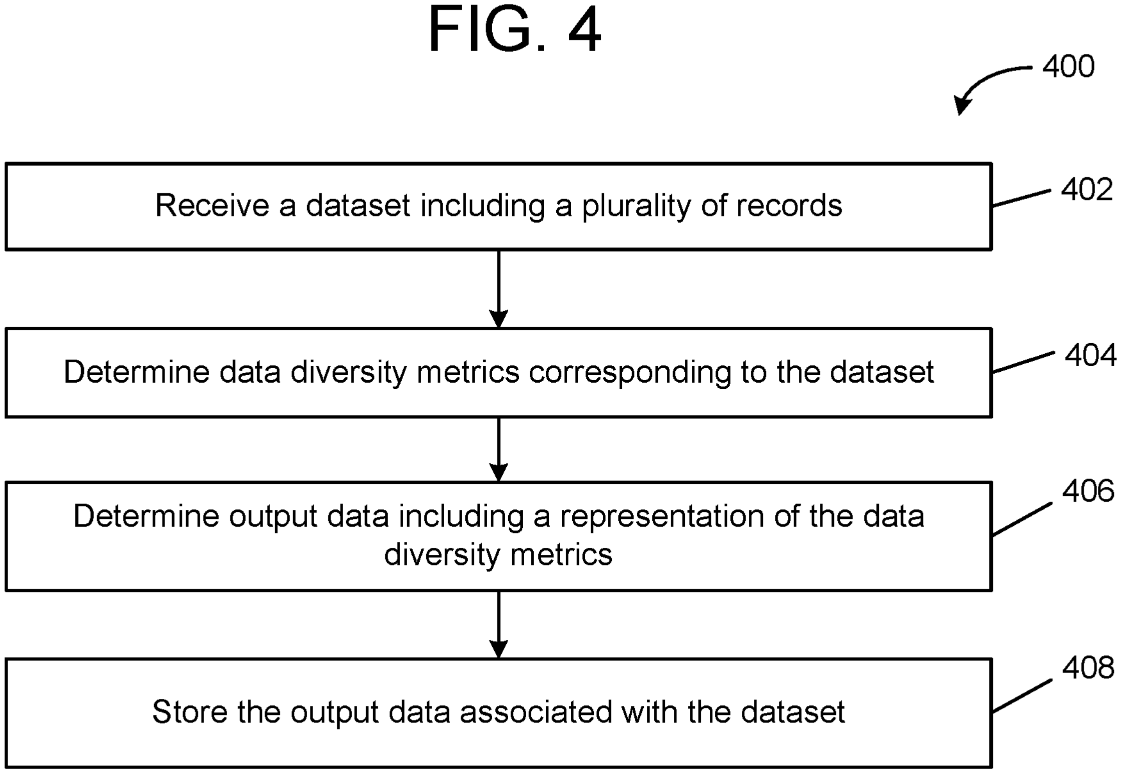
FIG. 4 is a flowchart illustrating an example process for determining data diversity metrics for a dataset, according to embodiments of the present disclosure.

FIG. 4 is a flowchart illustrating an example process 400 for determining data diversity metrics for a dataset, according to embodiments of the present disclosure. At a step 402, the system may receive a dataset (e.g., the input data 105) including a plurality of records (e.g., records 106). As described herein, an individual record 106 may be an individual training sample and may include a single sentence or multiple sentences; the multiple sentences may represent a paragraph(s), a dialog between two or more users or a user(s) and a system, etc. The records 106 may include natural language, in form of text data or other type of data, and may be used to train machine learned models, such as language models. In some embodiments, the dataset may include data from various sources, including various different websites, old/permitted books, manually-generated data, machine-generated data, etc.

At a step 404, the system may determine (e.g., using the data diversity component 110 shown in FIG. 1) data diversity metrics (e.g., data diversity metrics 120 shown in FIG. 1) corresponding to the dataset. As described above in relation to FIG. 1, the data diversity metrics 120 may include various different metrics, including but not limited to, diversity index for sentence count 124, syntactic metrics 125, readability 146, topic distribution 148, lexical metrics 130, semantic metrics 150 and linguistic metrics 160. The data diversity component 110 may use various techniques (e.g., topic component 112, NLP component 114, encoder 115, semantic evaluation component 116, diversity index component 118) to determine the data diversity metrics 120. In some embodiments, the controller component 119 may cause the components to determine all of the data diversity metrics 120 shown in FIG. 1. In some embodiments, the controller component 119 may cause the components to determine some of the data diversity metrics 120 based on an input (e.g., from a user, a system component, etc.) indicated one or more metrics of interest (e.g., determine topic distribution, determine sentence structure diversity, etc.).

At a step 406, the system may determine output data including a representation of the data diversity metrics 120. For example, the output data may include text, icons, graphics, etc. based on the data diversity metrics 120. In some embodiments, the output data may be based on whether some of the individual data diversity metrics 120 satisfy certain conditions (e.g., conditions provided by a user, pre-defined conditions, stored conditions, etc.). For example, the output data may include a green check mark icon if the diversity index for sentence count 124 satisfies a threshold condition. As another example, the output data may include a red cross mark icon if the lexical metrics 130 fail to satisfy a threshold condition.

In some embodiments, the output data may include individual data diversity metrics 120 associated with individual records 106 or groups of records 106. As described herein some of the data diversity metrics 120 may be based on an individual record 106, while others may be based on two or more records 106 (e.g., a comparison of two or more records). For example, the output data may include a readability metric 146 associated with each record 106 in the dataset. As a further example, the output data may include semantic metrics 150 associated with a group of records (e.g., records 106*a*-106*d*).

At a step 408, the system may store the output data associated with the dataset. In some cases, the output data may be used at a later time, for example, presented to a user via a device, used to select training data, used to evaluate an inputted training sample, etc., some of which are described below.

In some embodiments, the process 400 may be performed for multiple other datasets and the system may store output data associated with the individual datasets. As such, the output data may represent diversity quality for individual datasets. The output data may be used to determine which of the evaluated datasets includes high quality of diverse training samples.

Figure 5:
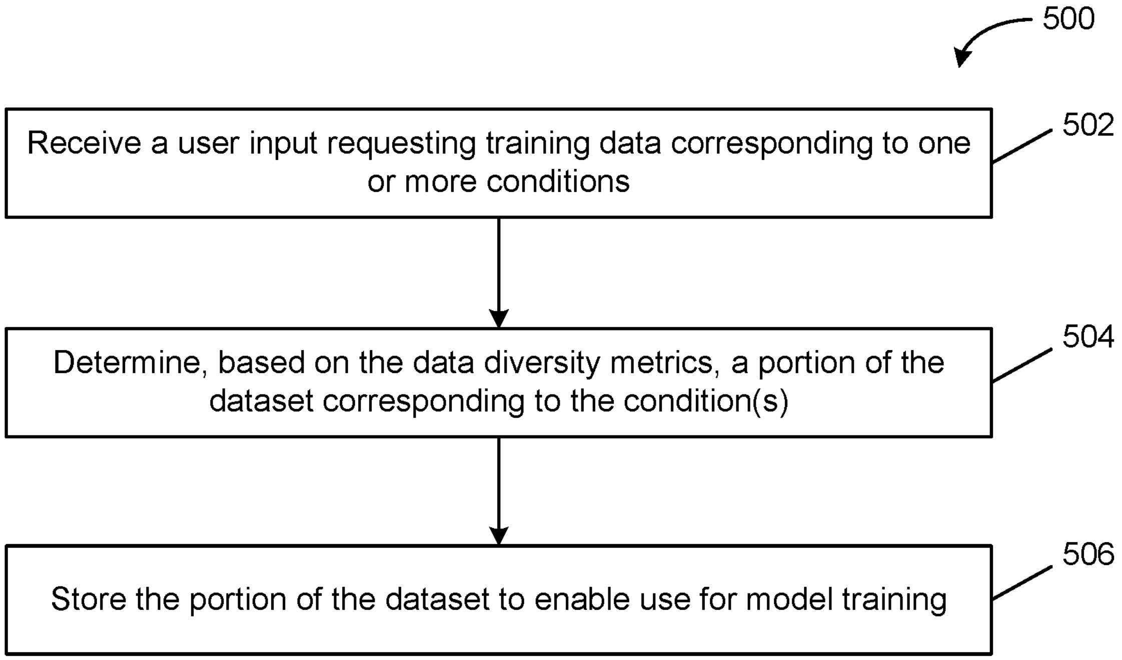
FIG. 5 is a flowchart illustrating an example process for selecting training data based on the data diversity metrics for the dataset, according to embodiments of the present disclosure.

FIG. 5 is a flowchart illustrating an example process 500 for selecting training data based on the data diversity metrics 120 for the dataset, according to embodiments of the present disclosure. In some cases, the data diversity metrics 120 may be determined previously as described above in relation to FIG. 4 and the output data (at step 408) may be stored associated with the dataset. At a step 502 of the process 500, the system may receive a user input (e.g., the data selection input(s) 215 shown in FIG. 2) requesting training data corresponding to one or more conditions. The conditions may relate to diversity levels for certain data metrics. For example, the user input may request training data including records 106 associated with a particular readability metric/level, associated with a particular topic(s), associated with a high level of lexical diversity, etc.

At a step 504, the system may determine, based on the data diversity metrics, a portion of the dataset (a portion of the input data 105) corresponding to the condition(s). As described in relation to FIG. 2, the input data 105 may be filtered and/or data may be sampled therefrom based on records satisfying the condition(s) to determine the selected dataset 230. In some embodiments, the system may determine the records 106 satisfying the condition(s) from a single dataset. In other embodiments, the system may determine the records 106 satisfying the condition(s) from multiple different datasets. The user may specify which datasets to select the records from, thus enabling a developer to evaluate and easily select training samples from multiple various sources/datasets.

At a step 506, the system may store the portion of the dataset (e.g., the selected dataset 230 shown in FIG. 2) to enable use for model training. The portion of the dataset may be provided to a model training component for training a language model or other types of models. In this manner, a developer can use the system to generate a training dataset satisfying desired data metrics (e.g., diversity metrics).

Figure 6:
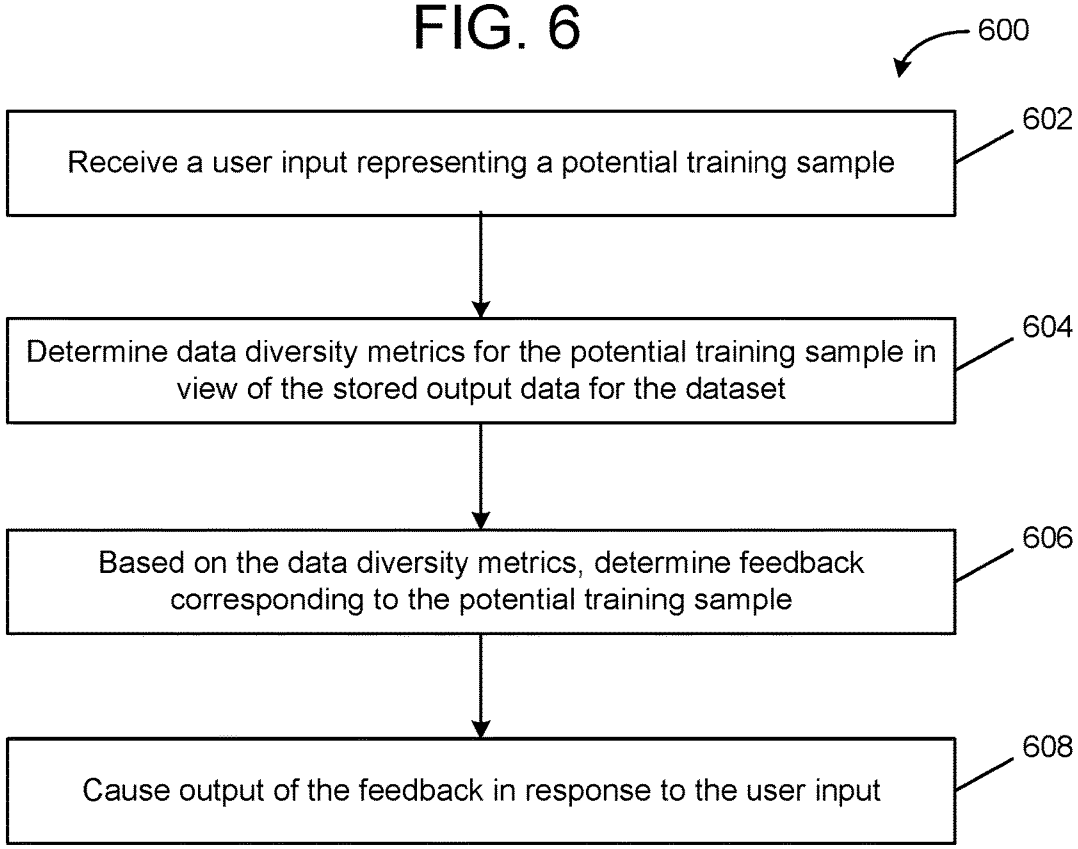
FIG. 6 is a flowchart illustrating an example process for providing feedback with respect to a potential training sample based on the data diversity metrics for the dataset, according to embodiments of the present disclosure.

FIG. 6 is a flowchart illustrating an example process 600 for providing feedback with respect to a potential training sample based on the data diversity metrics for the dataset, according to embodiments of the present disclosure. In some cases, the data diversity metrics 120 may be determined previously as described above in relation to FIG. 4 and the output data (at step 408) may be stored associated with the dataset. At a step 602 of the process 600, the system may receive a user input (e.g., the sample input 315 shown in FIG. 3) representing a potential training sample. In some cases, a user (e.g., a developer, an annotator, etc.) may be prompted to provide a training sample via a user interface (e.g., as described and shown in relation to FIGS. 7A-7C). For example, the user interface may present a question, a dialog, etc., and may request the user to answer the question, complete the dialog, etc. The potential training sample may be requested to supplement, update or otherwise add to the dataset.

At a step 604, the system may determine data diversity metrics 120 for the potential training sample in view of the stored output data for the dataset (from step 408 of FIG. 4). Some of the data diversity metrics 120, such as readability metric 146 and topic distribution 148 may be determined using the potential training sample on its own. Other data diversity metrics 120 may be determined using the output data/the dataset and the potential training sample. For example, the system may determine the semantic metrics 150 by comparing the potential training sample with the dataset or a portion of the dataset. As another example, the system may determine the linguistic metrics 160 by comparing the potential training sample with the dataset or a portion of the dataset.

At a step 606, the system may, based on the data diversity metrics, determine feedback (e.g., the feedback for sample 330 shown in FIG. 3) corresponding to the potential training sample. The feedback may inform the user whether or not the potential training sample satisfies certain conditions (e.g., data diversity conditions, condition(s) for samples 325, etc.), where some of the conditions may be based on the stored output data/data diversity metrics for the dataset (e.g., a dataset with training samples). For example, the feedback may be based on a condition indicating that a training sample is to include multiple different pronouns and whether or not the potential training sample includes multiple different pronouns. As another example, the feedback may be based on the dataset including particular topics and whether or not the potential training sample is different from the topics of the dataset. The feedback may include a representation of the data diversity metrics 120 for the dataset. The feedback may include an instruction/request for a further/another training sample.

Figure 7A:
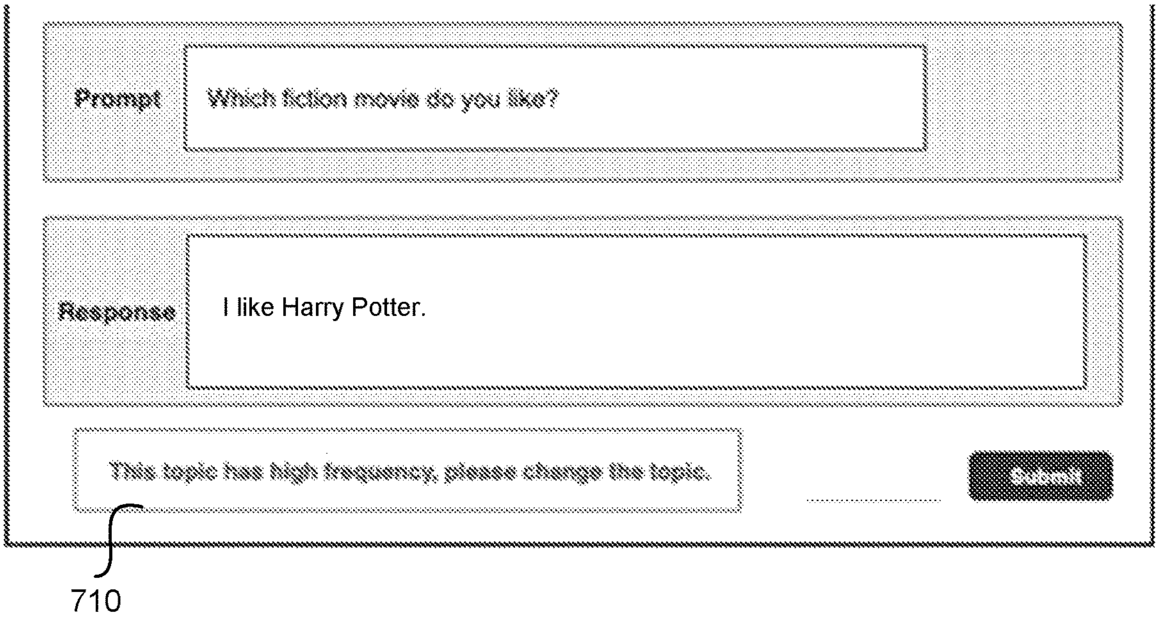
FIGS. 7A-7C illustrate an example user interface for providing the feedback with respect to the potential training sample, according to embodiments of the present disclosure.
Figure 7B:
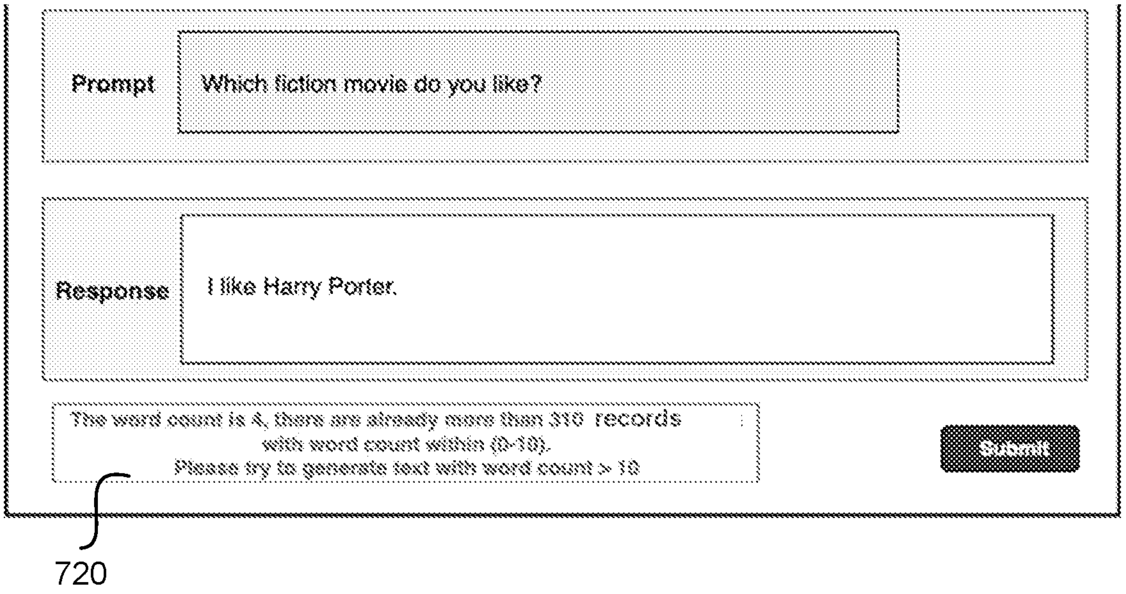
Figure 7C:
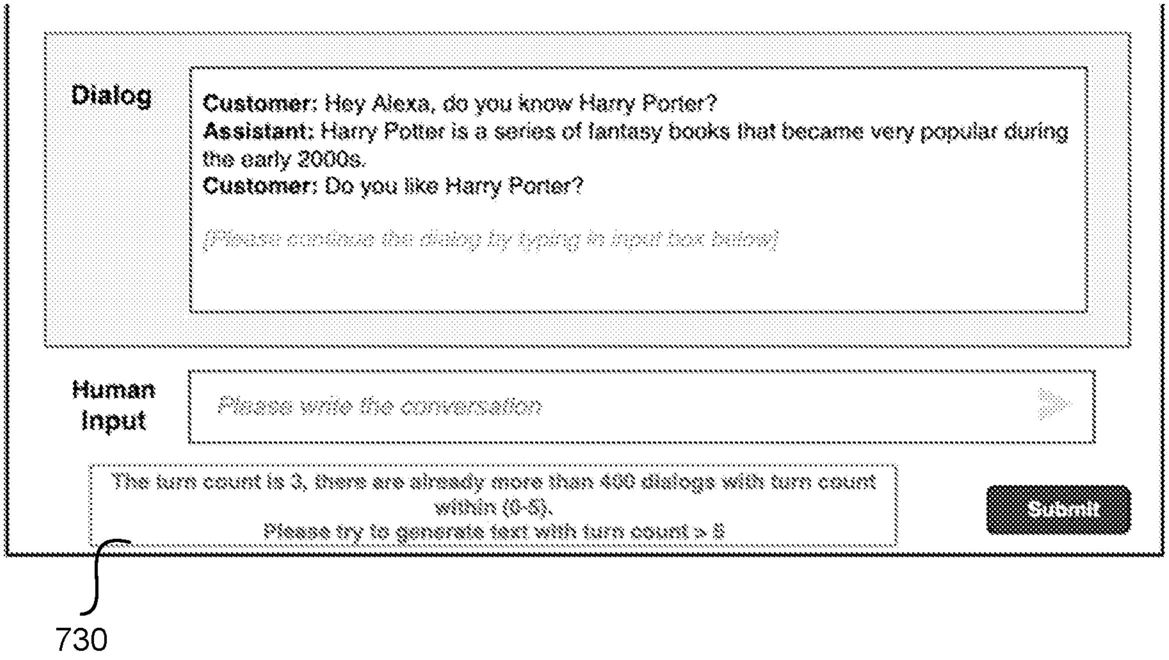

At a step 608, the system may cause output of the feedback in response to the user input (received at step 602). FIGS. 7A-7C illustrate an example user interface for providing the feedback with respect to the potential training sample. As shown in FIG. 7A, the user interface may present a prompt (e.g., "Which fiction movie do you like?") for an input representing a potential training sample. A user may provide a user input (e.g., Response: "I like Harry Potter"). The system may process the user input, in view of the data diversity metrics 120 for the dataset, and may determine the feedback for the user input. As shown in FIG. 7A, the user interface may present feedback 710 "This topic has high frequency, please change the topic.", which may be based on the topic distribution 148 for the dataset representing that a certain number of records 106 in the dataset correspond to the particular movie "Harry Potter."

Referring to FIG. 7B, which shows another example user interface, the feedback 720 "The word count is 4, there are already more than 310 records with word count within 0-10. Please try to generate text with word count>10.", may be generated based on the lexical metrics 130/words per sentence 132 and/or based on a diversity index for word count for the records 106 in the dataset. As shown, in some embodiments, the feedback may include a number of records 106 that correspond to the particular data diversity metric, so as to inform the user of the existing dataset and to guide generation of additional training samples of diverse quality. As shown, the feedback may include a request for another training sample that satisfies a particular condition (e.g., word count>10).

Referring to FIG. 7C, which shows another example user interface, the user may be prompted to continue or complete a dialog by providing one or more a dialog turns for the user and/or the system response. As shown, the feedback 730 may be "The turn count is 3, there are already more than 400 dialogs with turn count within 0-5. Please try to generate text with turn count>5." The feedback 730 may be based on the data diversity component 110 determining a dialog turn count metric for the records 106 in the dataset and based on a number of the records corresponding to the same dialog turn count as the user input/potential training sample.

Certain systems may be configured to respond to natural language (e.g., spoken or typed) user inputs. For example, in response to the user input "what is today's weather," the system may output weather information for the user's geographic location. As another example, in response to the user input "what are today's top stories," the system may output one or more news stories. For further example, in response to the user input "tell me a joke," the system may output a joke to the user.

A system may receive a user input as speech. For example, a user may speak an input to a device. The device may send audio data, representing the spoken input, to the system. The system may perform ASR processing on the audio data to generate ASR data (e.g., text data, token data, etc.) representing the user input. The system may perform processing on the ASR data to determine an action responsive to the user input. A system may also receive a natural language user input in the form of text, such as a text input from a computer, phone, or other device.

In some instances, the system may be configured to process input text data (such as ASR data or text entered into a user interface) using one or more language models (e.g., one or more large language models (LLMs)) to determine a response to the user input. For example, in response to a user input of "what is the history of the National Football League," the language model(s) may output a synopsis of the founding of the National Football League.

Figure 8:
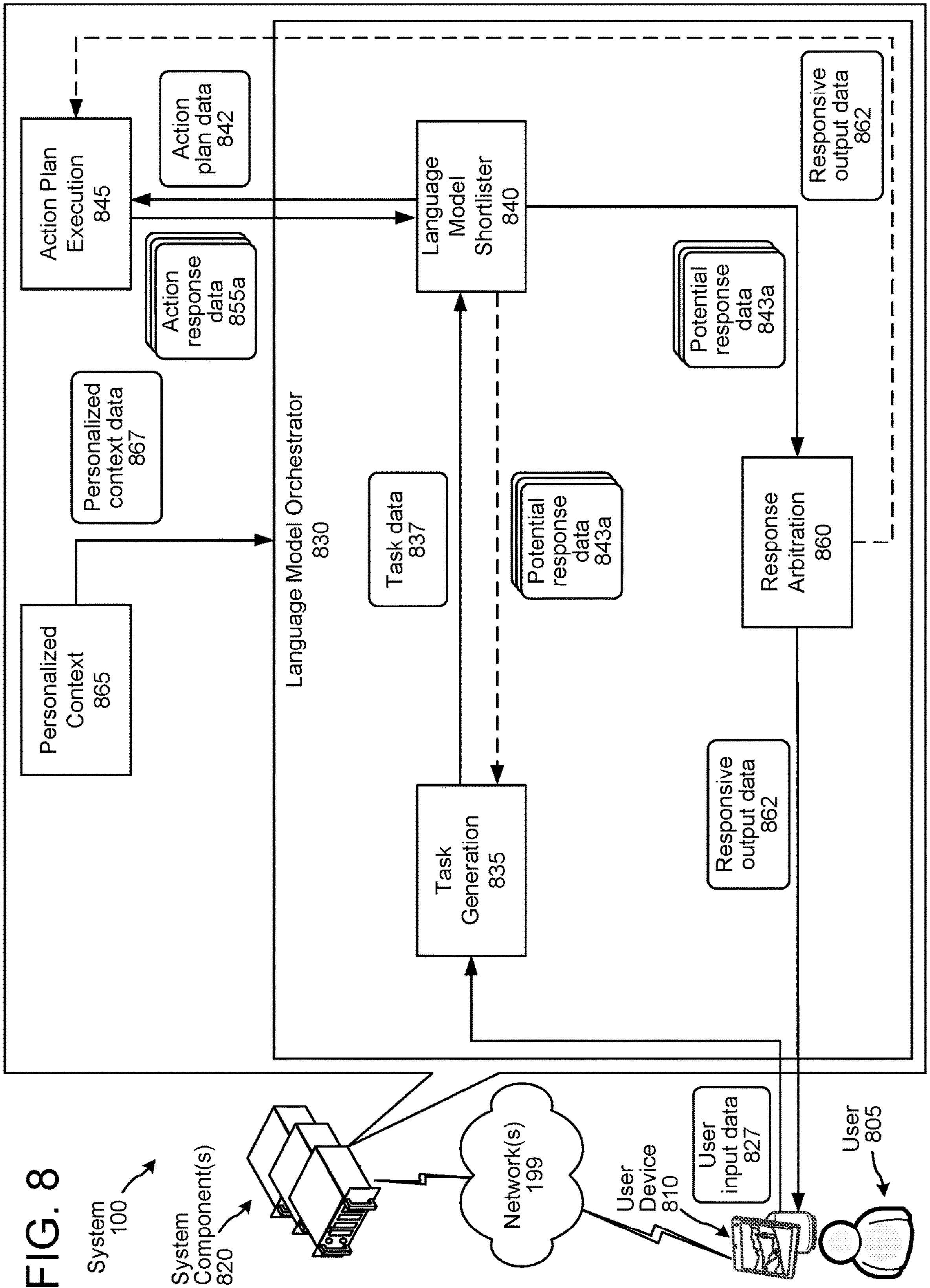
FIG. 8 is a conceptual diagram illustrating example components and processing of a system configured to use a language model(s) to determine a response to a user input, according to embodiments of the present disclosure.

FIG. 8 illustrates further example components included in the system 100 configured to determine an action responsive to a user input. As shown in FIG. 8, the system may include a user device 810, local to a user 805, in communication with a system component(s) 820 via a network(s) 199. The network(s) 199 may include the Internet and/or any other wide- or local-area network, and may include wired, wireless, and/or cellular network hardware.

The system component(s) 820 may include various components, such as a language model orchestrator component 830, a personalized context component 865, and an action plan execution component 845. The language model orchestrator component 830 may include a task generation component 835, a language model shortlister component 840, and a response arbitration component 860.

In some embodiments, the language model orchestrator component 830 may generate prompt data representing a prompt for input to the language models. As shown in FIG. 8, the system component(s) 820 receive user input data 827, which may be provided to the language model orchestrator component 830. In some instances, the user input data 827 may correspond to various data types, such as text (e.g., a text or tokenized representation of a user input), audio, image, video, etc. For example, the user input data may include input text (or tokenized) data when the user input is a typed natural language user input. For further example, prior to the language model orchestrator component 830 receiving the user input data 827, another component (e.g., an automatic speech recognition (ASR) component 1250) of the system 100 may receive audio data representing the user input. The ASR component 1250 may perform ASR processing on the audio data to determine ASR data corresponding to the user input, which may correspond to a transcript of the user input. As described below, with respect to FIG. 12, the ASR component 1250 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 1250 level of confidence that the corresponding hypothesis represents what the user said. The ASR component 1250 may also determine token scores corresponding to each token/word of the ASR hypothesis, where the token score indicates the ASR component's 1250 level of confidence that the respective token/word was spoken by the user. The token scores may be identified as an entity score when the corresponding token relates to an entity. In some instances, the user input data 827 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 100 may include one or more components configured to process such user inputs to generate the text or tokenized representation of the user input (e.g., the user input data 827).

In some embodiments, the language model orchestrator component 830 may receive input data, which may be processed in a similar manner as the user input data 827 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the user device 810, a user entering the home, etc.). In some embodiments, the system 100 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 100 may include one or more components configured to process the input data to generate a natural language representation of the input data. The system 100 may process the input data and may perform an action. For example, in response to detecting a garage door opening, the system 100 may cause garage lights to turn on, living room lights to turn on, etc. As another example, in response to detecting an oven beeping, the system 100 may cause a user device 810 (e.g., a smartphone, a smart speaker, etc.) to present an alert to the user. The language model orchestrator component 830 may process the input data to generate tasks that may cause the foregoing example actions to be performed.

The user input data 827 may be received at the task generation component 835 of the language model orchestrator component 830, which may be configured to generate a list of (e.g., one or more) tasks (e.g., steps/actions) that are to be completed in order to perform an action responsive to the user input and select a task of the list of the tasks that is to be completed first (e.g., in a current iteration of processing by the system 100), as described in detail herein. For example, for a user input of "What is the weather for today," the task generation component 835 may generate a list of tasks of "(1) determine current outside temperature from thermostat; and (2) determine weather forecast for today" and select the task of "determine weather forecast for today" to be completed first. In instances where the task generation component 835 generates more than one task to be completed in order to perform the action responsive to the user input, the task generation component 835 may further maintain and prioritize the list of tasks as the processing of the system 100 with respect to the user input is performed. In other words, as the system 100 processes to complete the list of tasks, the task generation component 835 may (1) incorporate the potential responses associated with completed tasks into data provided to other components of the system 100; (2) update the list of tasks to indicate completed (or attempted, in-progress, etc.) tasks; (3) generate an updated prioritization of the tasks remaining to be completed (or tasks to be attempted again); and/or (4) determine an updated current task to be completed.

In some embodiments, the task generation component 835 may process as described above using language model(s) (e.g., LLMs). For example, the task generation component 835 may include a language model (e.g., and LLM) configured to generate the list of tasks that are to be completed in order to perform the action responsive to the user input and select a task of the list of tasks that is to be completed first. In some such embodiments, the user input data 827 may be received at a prompt generation component configured to generate a prompt for input to the language model. The prompt may include the user input data 827 and various other information usable by the language model to generate the list of tasks that are to be completed in order to perform the action responsive to the user input (e.g., an indication of a remaining task(s) to be completed with respect to the user input, an indication of a potential response(s) associated with a completed task(s), and/or various contextual signals associated with the user input. The prompt may be a directive for the language model to determine the list of tasks given the information included in the prompt. The language model may process the prompt to generate the list of tasks.

The task generation component 835 may generate and send task data 837 representing the selected task to be completed and various other information needed to perform further processing with respect to the task (e.g., the user input data 827, an indication of the selected task, potential responses associated with previous tasks, the remaining task(s), and context data associated with the user input data 827, as described in detail herein) to the language model shortlister component 840.

Application programming interfaces (APIs) are a way for one program/component to interact with another. API calls are the medium by which they interact. An API call, or API request, is a message sent to a system component asking an API to perform an action, provide a service or information, or the like. An API call may be formatted for the particular API and may include a particular request, optionally using particular arguments and argument values. API calls may be used for a variety of purposes, such as controlling other devices (e.g., an API call of turn_on_device (device="indoor light 1") corresponds to a directive/request to a component to turn on a device associated with the identifier "indoor light 1"), obtaining information from other components (e.g., an API call of InfoQA.question ("Who is the president of USA?") corresponds to a directive/request to a component to find and provide an answer to the indicated question), and performing other actions (e.g., generating synthesized speech, searching data sources, etc.).

In some embodiments, the system may include an API retrieval component configured to receive a search query and output one or more API calls (or API data) matching the search query. API data may include an API call, API description, component description, and other information associated with the API call. In some embodiments, a language model of the system may generate an action to be performed with respect to the user input, where the action may be represented as an action description, an API, an API description, etc. Based on the generated action, the system may use the API retrieval component to determine one or more APIs available to perform the generated action. For example, in response to the user input "book a flight", the language model may generate the action "I need to find an API to book flight" or "I need to book a flight using Book.flight ([Departure], [Arrival])." Based on the generated action, the system may search the API retrieval component to determine one or more API calls corresponding to booking a flight (e.g., Bookflight.location ("departing airport code", "arrival airport code"), Bookflight.date ("departing date"), bookflight.rountrip ("departing location", "arrival location", "departure date", "return date"), Airline-BookFlight ("departing airport code", "arrival airport code"), etc.). Based on the user input and other information (e.g., context data corresponding to the user input, user preferences, past user interactions, further information received from user, etc.), the system may select one or more of the determined API calls to execute.

The language model shortlister component 840 may be configured to determine one or more components (e.g., a responding component, such as APIs, skill component(s), language model (e.g., LLM) agent component(s), a TTS component, etc. as discussed herein) configured to perform an action related to the user input or the current task. The language model shortlister component 840 may further be configured to generate and cause the execution of a request (s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task). For example, for a current task of "determine weather forecast for today," the language model shortlister component 840 may generate requests of "use Weather Application A to determine weather forecast for today" and "use Weather Application B to determine weather forecast for today," or the like.

In some embodiments, the language model shortlister component 840 may process as described above using a language model(s) (e.g., LLMs). For example, the language model shortlister component 840 may include a language model (e.g., an LLM) configured to determine one or more components configured to perform an action related to the user input or the current task and cause the execution of a request(s) for the component(s) to provide a potential response(s) to the user input or current task. In some such embodiments, the task data 837 may be received at a prompt generation component configured to generate a prompt for input to the language model. The prompt may include the task data 837 and an indication of component(s) (e.g., APIs) determined to be relevant to the current task/the user input. The prompt may be a directive for the language model to generate a request for a component(s) (of the components determined to be relevant) to provide a potential response(s) to the user input or current task given the information included in the prompt. The language model may process the prompt to generate the request(s).

Such requests may be represented in the action plan data 842 sent to the action plan execution component 845. The action plan execution component 845 may identify the request(s) in the action plan data 842, generate executable API calls corresponding to the request(s), and cause the corresponding components (e.g., the responding component(s)) to generate action response data 855*a-n* representing the requested potential response(s), where individual action response data 855*a* may be provided by/correspond to a particular responding component. In some embodiments, the action response data 855*a-n* may include an identifier (e.g., a component name, an alphanumerical value associated with the component, etc.) for the component providing the data. The language model shortlister component 840 receives and processes the action response data 855*a-n* and generates potential response data 843*a-n* representing the potential response(s) (e.g., relevant potential responses, selected potential responses, ranked potential responses, etc.) for further processing (e.g., as described in detail herein). If the language model shortlister component 840 determines that there are no remaining tasks to generate potential responses for, the language model shortlister component 840 may send the potential response data 843*a-n* to the response arbitration component 860.

The potential response data 843*a-n*, in some embodiments, may be determined based on receiving potential responses from various different components that may be relevant in responding to the user input data 827. For example, the potential response data 843*a-n* may include a first potential response from a first component configured to perform a first task determined by the task generation component 835, a second potential response from a second component configured to perform a second task determined by the task generation component 835, etc. The potential response data 843*a-n* can include more than one potential response relating to an individual task. In some embodiments, the potential response data 843*a-n* may be natural language data.

The response arbitration component 860 processes the potential response data 843*a-n* to determine whether the potential responses generated for the task(s) are responsive to the user input. The response arbitration component 860 processes the potential response data 843*a-n* (representing at least the generated potential responses) and selects one or more of the potential responses that are determined to be responsive to the user input and/or determines that none of the actions are responsive to the user input. For example, the response arbitration component 860 may process the potential response data 843*a-n* to determine if one or more of the potential responses performable by the API(s) (e.g., the potential responses and/or potential actions) are responsive to the current task. In some embodiments, the response arbitration component 860 may generate a natural language summary of one or more of the selected responses and output the natural language summary. For example, for a user input of "what is the weather for today" and potential responses of "The weather for today is a high of 75 and a low of 68" and "The weather for today is mostly sunny with a slight chance of rain in the evening," the response arbitration component 860 may generate a natural language summary of "The weather for today is expected to be mostly sunny with a high of 75 and a low of 68 and a slight chance of rain in the evening," or the like.

In some embodiments, the response arbitration component 860 may process as described above using language model(s) (e.g., LLMs). For example, the response arbitration component 860 may include a language model (e.g., an LLM) configured to generate a response to the user input using one or more of the potential responses that are determined to be responsive to the user input and/or determines that none of the potential responses are responsive to the user input. In some such embodiments, the user input data 827 and the potential responses (and in some embodiments, the contextual signals associated with the user input) may be received at a prompt generation component configured to generate a prompt for input to the language model including the information. The prompt may be a directive for the language model to, given the information included in the prompt, generate a response to the user input using one or more of the potential responses that are determined to be responsive to the user input and/or indicate that none of the potential responses are responsive to the user input. The language model may process the prompt to generate the response to the user input or the indication that none of the potential response are responsive to the user input. In instances where the language model generate the indication that none of the potential responses are responsive to the user input, the indication may further include a request for information to be output to the user (and/or provided to another component of the system configured to determine the information).

The output generated by the response arbitration component 860 may be provided to one or more components of the system 100 (e.g., the TTS component 1256, a visual output component, etc. via, for example, the action plan execution component 845) and/or sent to the device 810 for output to the user.

Figure 9:
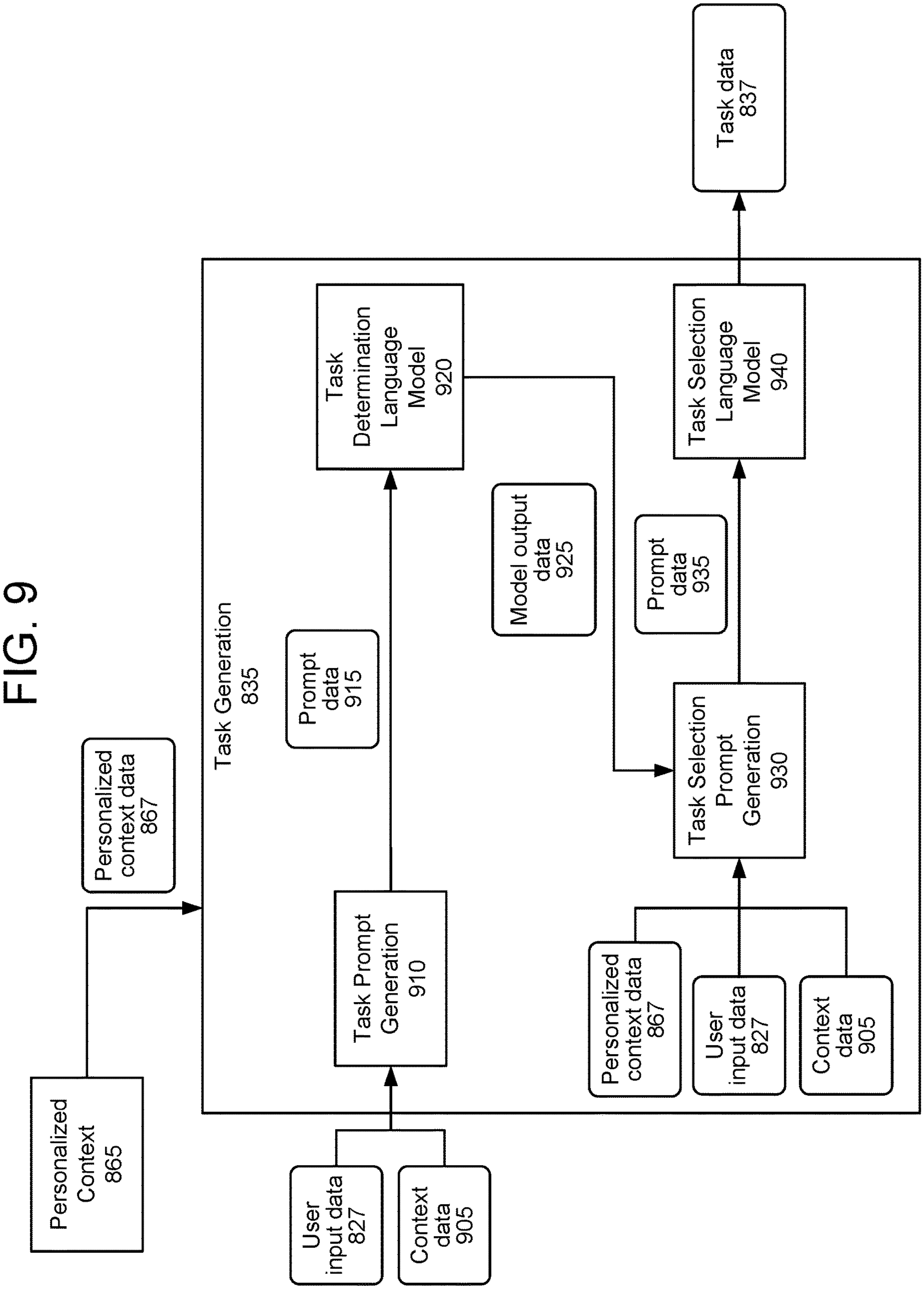
FIG. 9 is a conceptual diagram illustrating example components and processing of a task generation component of the system, according to embodiments of the present disclosure.

FIG. 9 illustrates example processing of the task generation component 835. As shown in FIG. 9, the task generation component 835 may include a task prompt generation component 910, a task determination language model 920, a task selection prompt generation component 930, and a task selection language model 940.

As further shown in FIG. 9, the user input data 827 is received at the task prompt generation component 910, which is configured to generate a list of (e.g., one or more) tasks (e.g., steps/actions) that are to be completed in order to perform an action responsive to the user input and select a task of the list of the tasks that is to be completed first (e.g., in a current iteration of processing by the system 100).

The task prompt generation component 910 processes the user input data 827 to generate prompt data 915 representing a prompt for input to the task determination language model 920. In some embodiments, the task prompt generation component 910 may further receive an indication of a remaining task(s) to be completed with respect to the user input data 827. A task to be completed may correspond to a task for which the system 100 has yet to generate potential responses for (e.g., for which the responding component 1050*a-n*, such as the API provider component, the language model agent component, the skill component 1254, and/or the TTS component 1256 have yet to generate action response data for). Similarly, a completed task may correspond to a task for which the system 100 has generated potential responses for (e.g., for which the responding component 1050*a-n*, such as the API provider component, the language model agent component, the skill component 1254, and/or the TTS component 1256 have generated action response data). For example, if the current iteration of processing with respect to the user input data 827 is a subsequent iteration of processing (e.g., the system previously determined that more than one task is to be completed in order to perform an action responsive to the user input data 827 and has previously generated potential responses for at least a first task of the more than one tasks), then the task prompt generation component 910 may further receive an indication of the remaining tasks to be completed. In such embodiments, the task prompt generation component 910 may further receive an indication of the task(s) to complete processing for and/or the potential response(s) of the processing. The task prompt generation component 910 may further receive the context data 905 representing various contextual signals associated with the user input data 827, such as weather information, time of day, device information associated with the device that sent the user input data 827 (e.g., device ID, device states, historical device interaction data, etc.). Such prompt data 915 may be generated based on combining the user input data 827 and the context data 905 (and, in some embodiments, the indication of the remaining task(s), completed task(s), and/or the potential responses). In some embodiments, the prompt data 915 may be generated further based on the personalized context data 867.

The task prompt generation component 910 may receive the personalized context data 867 from the personalized context component 865. As discussed herein above, the personalized context component 865 may be configured to determine and return contextual information associated with a user input to the one or more components of the system 100, such as the task prompt generation component 910, which the task prompt generation component 910 may combine with the user input data 827 to generate the prompt data 915.

As discussed herein above, the personalized context component 865 may be caused to generate and return the personalized context data 867 based on the system 100 determining that additional information is needed in order to generate potential responses for a task associated with a user input. For example, one or more of the components of the system 100 (e.g., the task determination language model 920, the task selection language model 940, the shortlister language model 1040, and/or the response arbitration component 860) may determine that an ambiguity exists in the user input (or the data determined/generated as a result of processing with respect to the user input). In such examples, the personalized context component 865 may receive the user input (e.g., the user input data 827), other data associated with the current task (e.g., one or more portions of the task data 837), and/or model output data indicating that an ambiguity exists/additional information should be determined (e.g., model output data representing "Does the user prefer to use [Music Streaming Service 1] or [Music Streaming Service 2] for playing music," "I need to determine whether the user prefers [Music Streaming Service 1] or [Music Streaming Service 2] for playing music" or the like). The personalized context component 865 may process as described herein above to generate the personalized context data 867 (e.g., "The user prefers [Music Streaming Service 1].")

In some embodiments, task prompt generation component 910 (or another component of the system 100) may process the personalized context data 867, the user input data 827, and/or the potential responses associated with the user input data 827 to generate a natural language representation of the user input (represented by the user input data 827) that is updated to include the contextual information of the personalized context data 867 (e.g., a contextual rewrite of the user input). Thereafter, the task prompt generation component 910 may process to generate the prompt data 915 using the updated user input data.

In some embodiments, the prompt data 915 may be a directive for the task determination language model 920 to determine one or more tasks (e.g., steps/actions) that are to be completed in order to perform an action responsive to the user input given the other information (e.g., the context data 905, the personalized context data 867, the indication of the remaining task(s), the indication of the completed task(s), and/or the corresponding potential responses) included in the prompt data 915.

The task determination language model 920 processes the prompt data 915 to generate model output data 925 representing one or more predicted tasks to be completed in order to perform the action responsive to the user input. For example, based on processing the first example prompt data provided above, the task determination language model 920 may output model output data 925*a*: {"turn on all of the lights except the garage light,"} or the like. For further example, as discussed above, based on processing prompt data corresponding to the user input "please order some pizza for dinner" the task determination language model 920 may output model output data 925*b*: {"identify user pizza preference;" "find application that enables ordering of pizza," or the like. After the first task of "identify user pizza preference" is complete, and based on processing the second example prompt data provided above, the task determination language model 920 may further output model output data 925*c*: {"find an application to order pizza" "find API to order [Pizza Company Name 1] pizza,"} or the like. In some embodiments, the threshold for determining the one or more tasks may be such that the task determination language model 920 is encouraged to generate multiple predicted tasks for a given user input, where the system 100 may parse and filter the list of tasks during downstream processing (e.g., during the processing of the task selection language model 940). For example, based on processing the first example prompt data provided above, the task determination language model 920 may output model output data 925*d*: {"turn on all of the lights except the garage light," "turn on all lights," "identify which garage light," "turn on all lights then turn off garage light," "turn on all lights where user is located," "turn on kitchen lights, living room lights, dining room lights, hallways lights" "turn on all lights on first floor,"} or the like.

The model output data 925 is sent to the task selection prompt generation component 930, which processes the model output data 925 to generate prompt data 935 representing a prompt for input to the task selection language model 940. In some embodiments, such prompt data 935 may be generated based on combining the user input data 827, the context data 905, the personalized context data 867, the prompt data 915, and/or the model output data 925. In some embodiments, the task generation component 835 may include another component that parses the model output data 925 to determine the one or more tasks and may send a representation of the one or more tasks to the task selection prompt generation component 930.

In some embodiments, the prompt data 935 may be a directive for the task selection language model 940 to select a task of the one or more tasks that is to be completed first (e.g., completed during the current iteration of processing) given the information (e.g., user input data 827, the context data 905, the personalized context data 867, and the one or more tasks) included in the prompt data 935. In some embodiments, the prompt data 935 may further include a directive for the task selection language model 940 to determine a priority of the one or more tasks (e.g., an ordered list representing the order in which the one or more tasks are to be completed).

The task selection language model 940 processes the prompt data 935 to generate model output data representing the task to be completed first and/or a prioritization of the one or more tasks. For example, based on processing the first example prompt data provided above, the task selection language model 940 may output model output data: {"1. Turn on all of the lights except the garage light,"} or the like. For further example, based on processing the second example prompt data provided above, the task selection language model 940 may output model output data: {"1. Find an API that sells [Pizza Company Name 1] pizza,"} or the like. In some embodiments, during processing of the task selection language model 940 to select and/or prioritize the one or more tasks, the task selection language model 940 may update the task list to remove any redundant and/or conflicting tasks. For example, for the second example prompt data, the task selection language model 940 may determine that the remaining tasks of "find an application that sells pizza" and "find an API that sells [Pizza Company Name 1] pizza" are redundant, and that "find an API that sells [Pizza Company Name 1] pizza has a higher priority. Therefore, the task selection language model 940 may remove the task of "find an application that sells pizza" from the remaining task list. Thereafter, the task generation component 835 (or another component of the task generation component 835) may process the model output data of the task selection language model 940 to determine task data 837 representing the user input data 827, the personalized context data 867, and/or the task selected by the task selection language model 940 to be completed first. In some embodiments, the task data 837 may include the remaining one or more tasks and/or may indicate the prioritization of the one or more tasks, as determined by the task selection language model 940. The task data 837 may be sent to the language model shortlister component 840, which is described in detail herein below with respect to FIG. 10.

Figure 10:
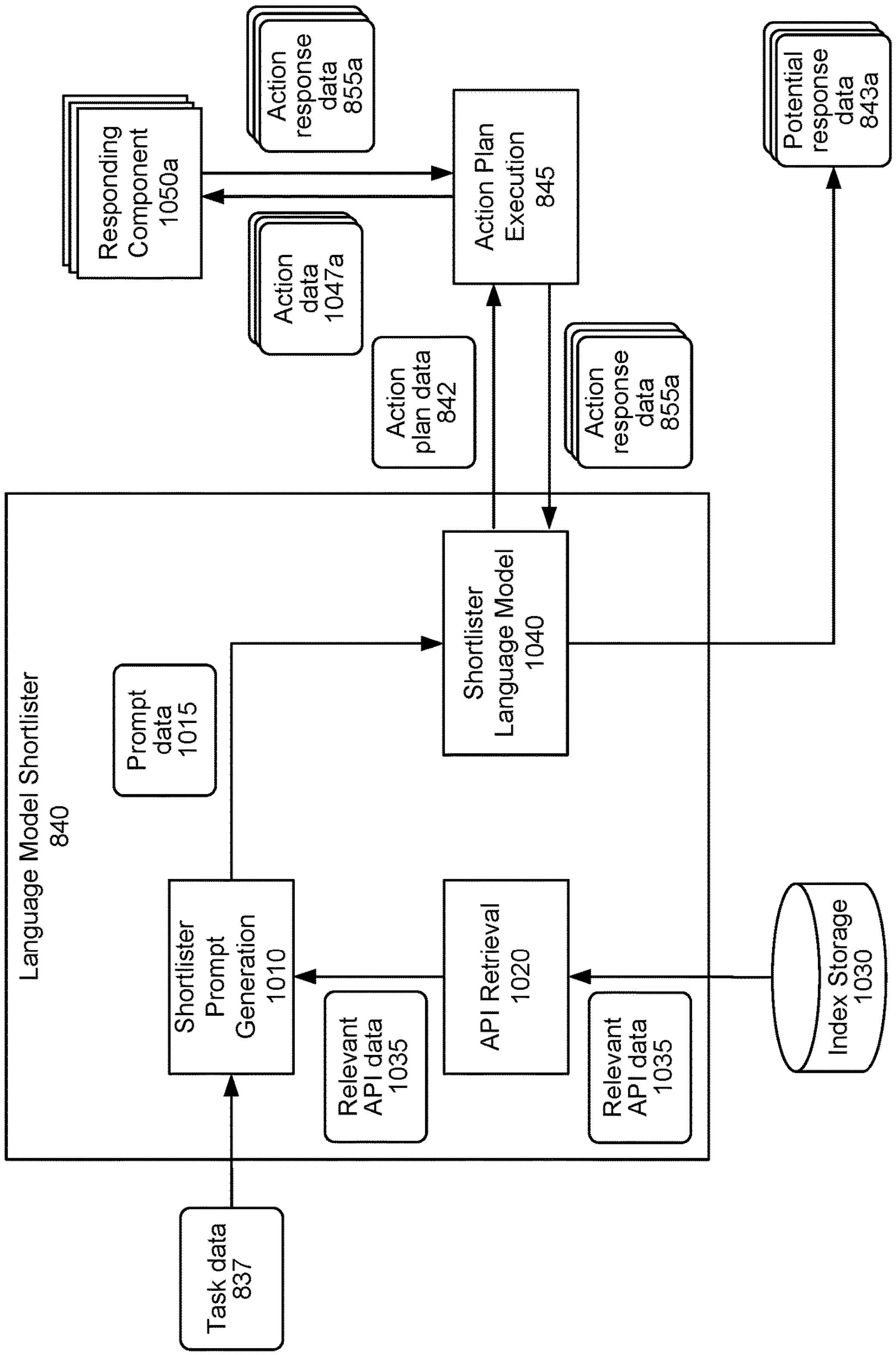
FIG. 10 is a conceptual diagram illustrating example components and processing of a language model shortlister component of the system, according to embodiments of the present disclosure.

FIG. 10 illustrates example processing of the language model shortlister component 840. As shown in FIG. 10, the language model shortlister component 840 may include an index storage 1030, an API retrieval component 1020, a shortlister prompt generation component 1010, and a shortlister language model 1040.

The language model shortlister component 840 is configured to determine one or more components, for example, responding components 1050*a-n* to perform an action related to the user input or the current task. Responding component(s) 1050*a-n* may be APIs, skill component(s) 1254, language model agent component(s), TTS component 1256, etc. In some embodiments, the responding components 1050*a-n* may be plugins that can be used with a language model described herein (e.g., the shortlister language model 1040, the task selection language model 940, etc.), where the plugin may add functionality and features to the language model capabilities.

In some embodiments, the language model shortlister component 840 is further configured to generate and cause the execution of a request(s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task).

As further shown in FIG. 10, the task data 837 is received at the shortlister prompt generation component 1010. The shortlister prompt generation component 1010 processes the task data 837 to generate prompt data 1015 representing a prompt for input to the shortlister language model 1040. In some embodiments, such prompt data 1015 may be generated based on combining the task data 837 (e.g., the user input data 827, the context data 905, the selected task, remaining tasks, potential responses associated with one or more previous tasks, etc.) and relevant API data 1035 representing one or more APIs associated with the user input data 827 and/or the current task.

The relevant API data 1035 may be generated by the API retrieval component 1020, which may be configured to retrieve one or more (e.g., top-k) relevant APIs associated with the user input data 827 or the current task. In some embodiments, the APIs may correspond to various components. For example, the components may correspond to rule-based components, ML-based components, language model-based components, or the like, such as the personalized context component 865, the orchestrator component 1230, the responding component 1050*a-n*, etc.) In some embodiments, the APIs may correspond to the components.

The API retrieval component 1020 may use retrieval-based approaches to retrieve the one or more relevant APIs from the index storage 1030, which may store various information associated with multiple APIs (and/or components) such as component descriptions, API arguments (e.g., parameter inputs/outputs), identifiers for components (e.g., such as personalized context component 865, the responding component 1050*a-n*, etc.) that provides the API, etc. For example, the API retrieval component 1020 may compare one or more APIs (and/or components) included in the index storage 1030 to the user input or the current task to determine one or more APIs (or components) (top-k) that corresponds to the user input or the current task (e.g., APIs (and/or components) that are semantically similar to the user input or the current task, APIs (and/or components) that are capable of performing the current task, etc.). In some embodiments, the API retrieval component 1020 (or another component of the API retrieval component 1020) may determine an encoded representation of the user input or the current task and compare (e.g., using cosine similarity) the encoded representation(s) to an encoded representation of a component description for the API (and/or component) to determine whether the API (and/or component) is semantically similar to the user input or the current task. A component description may correspond to a description of the one or more function that the API (and/or component) is configured to perform and/or other information associated with the API (and/or component) (e.g., an API call formatting structure (e.g., including input parameters), historical accuracy/defect rate, historical latency value, etc.). In some embodiments, the component description may further include one or more exemplars associated with use of the API (and/or component) (e.g., an example user input, corresponding API call, and example API output). If the value of semantic similarity meets or exceeds a threshold, the API (and/or component) (and, optionally, the component description) may be included in the relevant API data 1035. In some embodiments, the API retrieval component 1020 may determine the relevant API data 1035 further using contextual information, including the personalized context data 867, an accuracy/defect rate value associated with the APIs (and/or components), and/or a historical latency value associated with the APIs (and/or components) (e.g., which may be included in the description of the API). In some embodiments, the index storage 1030 may be included in the API retrieval component 1020. Similar processing may be performed to determine one or more components that are semantically similar to the user input or the current task, which may be included in the relevant API data 1035. The API retrieval may send the relevant API data 1035 to the shortlister prompt generation component 1010.

In some embodiments, the prompt data 1015 may be a directive for the shortlister language model 1040 to determine one or more APIs (and/or components) that are to process with respect to the user input or the current task (e.g., determine one or more API calls to cause the APIs (and/or components) to process) given the information (e.g., the user input data 827, the personalized context data 867, the current task, and the relevant API data 1035).

The shortlister language model 1040 processes the prompt data 1015 to generate one or more API calls corresponding to request(s) that the corresponding APIs (and/or components) return a potential response to the user input/current task and/or a potential action(s) that the APIs (and/or components) are configured to/will perform with respect to the user input and/or the current task (e.g., a natural language description of the potential action(s)). In some embodiments, the shortlister language model 1040 may generate API calls for a subset of the APIs represented in the prompt data 1015. For example, based on processing the first example prompt data provided above, the shortlister language model 1040 may output model output data: {"Use Let's chat API to turn on all of the lights except the garage light, Use Smart Home skill to turn on all of the lights except the garage light"}, {"Lets_chat.query ("turn on all of the lights except the garage light"), Smart_Home.turn_on_device ("[device names]"),} or the like. For further example, based on processing the second example prompt data provided above, the shortlister language model 1040 may output model output data: {"Use [Food Ordering Application 1] to order pizza, Use [Food Ordering Application 2] to order pizza" }, {[Food Ordering Application 1].order ("Brooklyn style pizza"), [Food Ordering Application 2].order ("Brooklyn style pizza"),} or the like.

The shortlister language model 1040 may generate the one or more APIs calls (including the required input parameters) by applying in-context learning for cold-starting API calls (e.g., one-shot/few-shot learning). For example, in embodiments where the relevant API data 1035 includes the component descriptions, the shortlister language model 1040 may use the one or more exemplars included in the component descriptions (included in the prompt data 1015) to determine the one or more input parameters for the API call. In some embodiments, the shortlister language model 1040 may be finetuned on such exemplars (e.g., during offline or runtime processing), such that the shortlister language model 1040 is capable of determining the one or more input parameters for the given API call.

During processing of the shortlister language model 1040 and after generating the one or more requests, the shortlister language model 1040 may cause the one or more requests to be executed. For example, as shown in FIG. 10, the shortlister language model 1040 may send action plan data 842 representing the one or more requests to the action plan execution component 845, which causes execution of the one or more requests included in the action plan data 842. For example, the action plan execution component 845 may process the action plan data 842 to generate action data 1047*a-n*. Action data 1047*a* may represent, for example, a directive (e.g., an executable API call determined from/generated based on the action plan data 842) for a particular API to process with respect to the user input and/or the current task. In embodiments where the action plan data 842 includes requests corresponding to incomplete API calls, API call formats, indications of actions to be performed by one or more components, the action plan execution component 845 may be configured to generate executable API calls corresponding to the action plan data 842. In some embodiments, the action plan execution component 845 may generate the action data 1047*a-n* to represent a directive to provide the responses including the potential response(s)/potential action(s) with respect to the user input and/or the current task.

In some embodiments, the shortlister language model 1040 may send model output data including the one or more requests to another component of the language model orchestrator component 830, which may be configured to parse the model output data to identify the one or more requests. Thereafter, the component may generate the action plan data 842 representing the one or more requests and send the action plan data 842 to the action plan execution component 845.

The action plan execution component 845 may send the action data 1047*a-n* to the responding component 1050*a-n*, such as the API provider component, the language model agent component, the skill component 1254, and/or the TTS component 1256. The API provider component may include one or more components (e.g., rule-based components, ML-based components, language model-based components, or the like) that may be caused to process using the action data 1047*a-n* (e.g., using the API calls generated by the language model shortlister component 840).

The TTS component 1256 may be configured to process textual or tokenized input to generate audio data representing synthesized speech corresponding to the textual or tokenized input spoken by a synthetic voice. The processing of the TTS component 1256 is discussed in detail below with respect to FIG. 12.

The skill component 1254 may be software running on the system component(s) 820 that is akin to a software application. That is, a skill component 1254 may enable the system component(s) 820 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 820 may be configured with more than one skill component 1254. For example, a weather service skill component may enable the system component(s) 820 to provide weather information, a car service skill component may enable the system component(s) 820 to book a trip with respect to a taxi or ride sharing service, a restaurant skill component may enable the system component(s) 820 to order a pizza with respect to the restaurant's online ordering system, etc. A skill component 1254 may operate in conjunction between the system component(s) 820 and other devices, such as the user device 810, in order to complete certain functions. A skill component 1254 may include hardware, software, firmware, or the like that may be dedicated to a particular skill component 1254 or shared among different skill components 1254.

The skill component(s) 1254 may correspond to one or more domains that are used in order to determine how to act on a spoken input in a particular way, such as by outputting a directive that corresponds to the determined intent, and which can be processed to implement the desired operation. The skill component(s) 1254 installed on the user device 810 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

The language model agent component may correspond to one or more language mode (e.g., LLM) agents. A language model agent component may correspond to a custom instantiation of a language model (e.g., an LLM (and other components)) that is configured to handle user inputs relating to a particular domain/functionality. In some embodiments, the language model agent component may be configured to handle specific use cases via particular prompt generation, fine-tuning of the language model, etc. For example, the language model agent component may be configured to handle user inputs/tasks related to information query, the language model agent component may be configured handle user inputs/tasks related to shopping, the language model agent component may be configured to handle user inputs/tasks related to ordering food from various restaurants, the language model agent component may be configured to handle user inputs/tasks related to ordering food from a particular restaurant (e.g., a particular pizza restaurant), the language model agent component may be configured to handle user inputs/tasks related to booking a hotel, the language model agent component may be configured to handle user inputs/tasks related to booking a flight, etc.

The API provider component may include various components that may be caused to execute using the action data 1047*a-n*. For example, the API provider component may include an entity recognition (ER) component, which may be configured to process textual or tokenized input to link one or more entity references included in the textual or tokenized input to a specific corresponding entity known to the system 100. For example, based on the textual or tokenized input (e.g., a context of the textual or tokenized input), the ER component may determine that a reference to "Neil Armstrong" is directed to the American astronaut. In some embodiments, the action data 1047*a-n* may include an indication(s) (e.g., slots) of one or more entities included in the user input, as determined by one or more of the language models 920, 940, 1040, in which case the ER component may process to link the one or more entities to the specific, referenced, entity known to the system 100.

In other embodiments, the ER component may be configured to process the action data 1047*a-n* to determine the one or more entities included in the user input and link the one or more determined entities to the specific, referenced, entity (entities) known to the system 100. For example, the ER component may include one or more recognizers. Each recognizer may include a named entity recognition (NER) component. The NER component applies grammar information and lexical information (received from a storage) associated with a domain (associated with the recognizer implementing the NER component) to determine a mention of one or more entities in text data. In this manner, the NER component identifies "slots" (each corresponding to one or more particular words in text data) that may be useful for later processing. The NER component may also label each slot with a type (e.g., noun, place, city, artist name, song name, etc.). Thereafter, the ER component links a slot of text data to a specific entity known to the system. To perform entity resolution, the ER component may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain domains (e.g., a shopping domain, a music domain, a video domain, etc.), or may be organized in a variety of other ways.

For further example, the API provider component may include a search component, which may be configured to query a storage (e.g., a database, repository, knowledge base, etc.) for information usable for generating a response to a user input. For example, if the action data 1047*a-n* represents a request for information of "Who won the game between [Team 1 Name] and [Team 2 Name]," then the search component may query the storage (or other sources, such as the Internet), to retrieve the information "[Team 1 Name] won the game between [Team 1 Name] and [Team 2 Name]."

As an even further example, the API provider component may include the device controller component discussed herein above, which may be further configured to cause a device to perform an action corresponding to the action data 1047*a-n*.

In some embodiments, the API provider component may include a domain service component, which may be configured for interacting with one or more services defined by particular users, such as developers, specialists, or the like (e.g., to receive information, such as responses or annotations, to cause an action.

One or more of the responding components 1050*a-n* may send action response data 855*a-n* representing one or more potential responses generated by the one or more APIs corresponding to the action data 1047*a-n* (e.g., the potential response(s) and/or potential action(s)) to the action plan execution component 845. For example, in response to an API call to the skill component 1254 associated with a user input for turning on a light, the action response data 855*a* may correspond to a potential action of "turn on the light," "turn_on_device ("light ", [device ID])", or the like. For further example, in response to an API call to the skill component 1254 associated with a user input for ordering a pizza from a particular restaurant, the action response data 855*b* may correspond to a potential action of "order medium pizza from [restaurant name]", "order_pizza ("medium", "pizza", "[restaurant name]")", or the like. The action plan execution component 845 may send the action response data 855*a-n* to the shortlister language model 1040.

In some embodiments, the action plan execution component 845 may send the action response data 855*a-n* to the shortlister prompt generation component 1010, which may generate further prompt data including the action response data 855*a-n* and be sent to the shortlister language model 1040. For example, the further prompt data may be generated based on combining the prompt data 1015 and the action response data 855*a-n*.

In some embodiments, the shortlister language model 1040 may process the action response data 855*a-n* (or the further prompt data including action response data 855*a-n*) to generate a natural language summary of the action response data (e.g., the potential response data 843*a-n*). In some embodiments, the potential response data 843*a-n* may include an association between action response data 855*a* (or a summarized representation of the action response data 855*a*) and an indication of the API/component that generated the action response data 855*a* (e.g., a component identifier, component description, etc.). In some embodiments, the shortlister language model 1040 may be configured to filter and/or rank the action response data 855*a-n* based on how relevant the action response data 855*a-n* is to the current task. In some embodiments, the shortlister language model 1040 may be configured to filter and/or rank the action response data 855*a-n* based on a confidence level of the component that provided the action response data, where the confidence level may indicate a likelihood of the component being able to respond (e.g., within a period of time), the component being able to perform a potential action that corresponds to the current task, etc. In some embodiments, the action response data 855*a-n* may indicate whether or not the corresponding component is able to respond (e.g., the action response data 855*a* may include a Boolean value such as "yes" or "no" or other similar indications). In some embodiments, the shortlister language model 1040 may filter and/or rank the action response data 855*a-n* based on information included in the prompt data 1015 (e.g., the user input data 827, the relevant API data 1035, the context data 905 the personalized context data 867, the prompt data 915, etc.). For example, the potential response data 843*a-n* may include a subset of the action response data 855*a-n* (or the summarized representations of the action response data 855*a-n*) and may further include a representation of a confidence associated with the action response data 855*a* (or a summarized representation of the action response data 855*a*). As such, the potential response data 843*a-n* may further include data representing a confidence of how relevant the action response data 855*a* is to the current task. In some embodiments, the shortlister language model 1040 may consider a rating associated with the component that provided the action response data 855*a*, where the rating may be a user satisfaction rating provided by multiple different users of the system 100, a user satisfaction rating provided by the user 805 associated with the user input data 827, a system generated rating based on the number of past tasks handled by the component, a accuracy rating based on the number of past tasks the component had handled correctly/provided a desired response for, etc.

The language model shortlister component 840 may send the potential response data 843*a-n* for further processing. In instances where the task generation component 835 determined that more than one task is to be completed, the language model shortlister component 840 may send the potential response data 843*a-n* to the task generation component 835, which may process as described herein above to maintain and prioritize the task list based on the potential response data 843*a-n* and select a new task to be completed. In instances where the task generation component 835 determined that only one task is to be completed, or in instances where the language model shortlister component 840 determines that there are no remaining tasks to be completed, the language model shortlister component 840 may send the potential response data 843*a-n*, and the potential responses associated with previously completed tasks (e.g., previous action response data) to the response arbitration component 860 to process as discussed herein above. The language model shortlister component 840 may further send the user input data 827, the context data 905, the personalized context data 867, etc., to the task generation component 835 and/or the response arbitration component 860.

In some embodiments, the language model orchestrator component 830 may further include a memory storage (not illustrated) which may store various information associated with the processing performed (e.g., user input data 827, the prompt data 915, the context data 905, the personalized context data 867, the model output data 925, prompt data 935, the task data 837, the relevant API data 1035, the prompt data 1015, the action plan data 842, the action response data 855*a-n*, the potential response data 843*a-n*, etc.) during one or more previous iterations of processing by the language model orchestrator component 830 for the user input data 827. As such, after the language model shortlister component 840 generates the potential response data 843*a-n*, the language model orchestrator component 830 may send the abovementioned data to the memory storage. In some embodiments, the above-mentioned data may be sent to the memory storage as it is generated by the system 100.

In such embodiments, one or more of the prompt generation components discussed herein may be configured to include (e.g., append) one or more portions of the data included in the memory storage in the data (e.g., the generated prompts) to the corresponding language models. For example, during a subsequent iteration of processing, the task prompt generation component 910 may receive one or more portions of the data included in the memory storage (which were generated during one or more previous iterations of processing performed with respect to the user input data 827) and include the one or more portions of data in the prompt data 915.

As discussed herein above, the shortlister language model 1040 may be configured to determine whether additional information is needed in order to complete the current task (e.g., if an ambiguity exists in the user input data 827 or the current task, if the current task is to resolve an identified ambiguity, if an API argument is missing from the user input or other available data, etc.), in which case the shortlister language model 1040 may send data representing a request for such additional information to the response arbitration component 860. In some embodiments, the action plan data 842 may represent the request for additional information, and the action plan execution component 845 may be configured to send corresponding action data 1047*a-n* to the personalized context component 865. For example, for the example provided herein above with respect to ordering pizza, the shortlister language model 1040 may determine that in order to resolve an ambiguity with respect to the user input data 827 or current task (e.g., based on the current task being to resolve the ambiguity or a determination that the current task cannot be completed due to the ambiguity), the system 100 must "identify user pizza preference," or the like. The system 100 may send a request to the personalized context component 865 to "identify user pizza preference" and the personalized context component 865 may process as described herein above to return personalized context data resolving the ambiguity (e.g., the user's pizza preference may be determined to be a cheese pizza or a pepperoni pizza).

Figure 11:
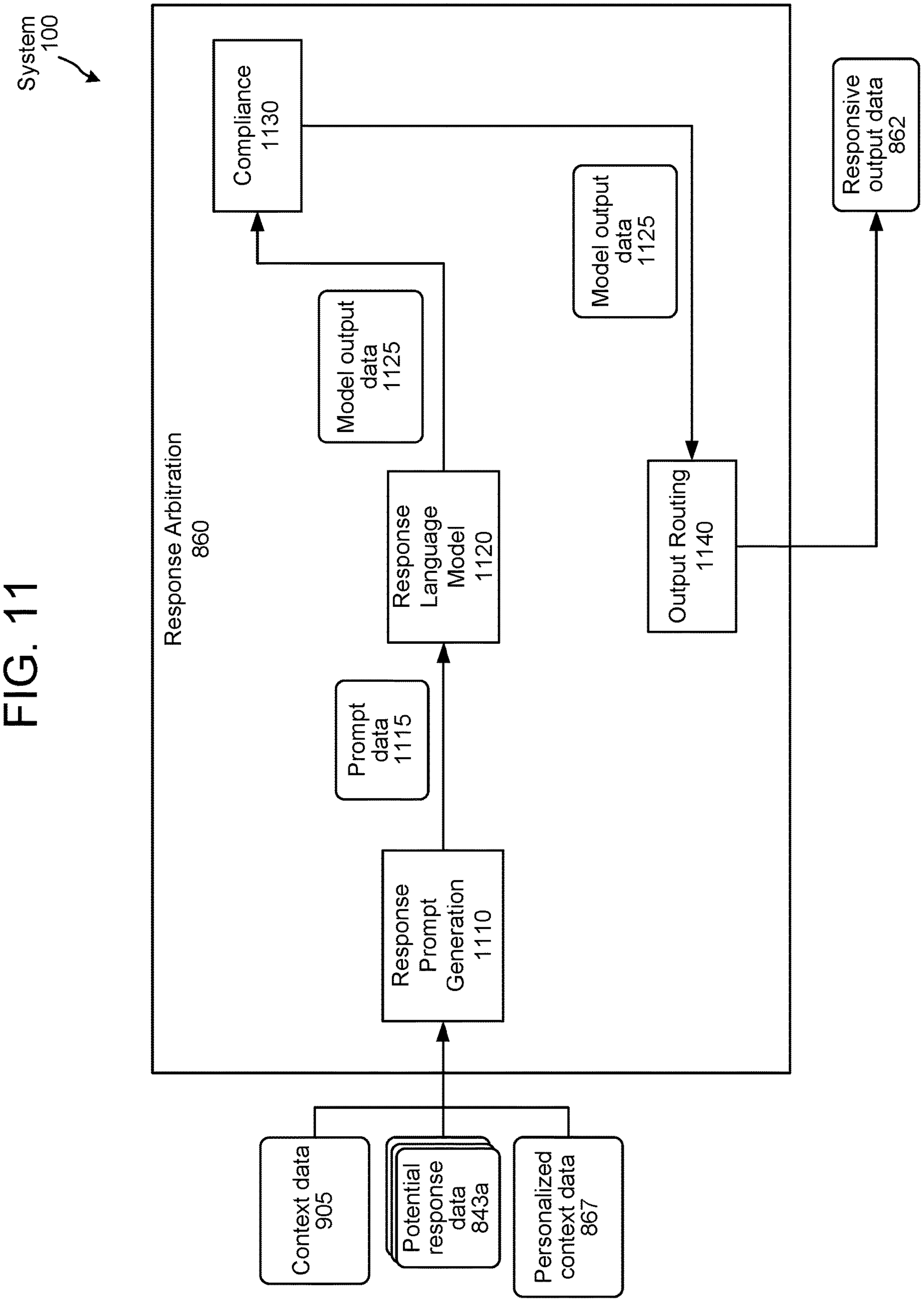
FIG. 11 is a conceptual diagram illustrating example components and processing of a response arbitration component of the system, according to embodiments of the present disclosure.

FIG. 11 illustrates example components and processing of the response arbitration component 860. As shown in FIG. 11, the response arbitration component 860 may include a response prompt generation component 1110, a response language model 1120, a compliance component 1130, and an output routing component 1140. As discussed herein above, the response arbitration component 860 processes the potential response data 843*a-n* (representing the potential responses generated by the one or more components determined to be associated with the user input) to determine whether one or more of the potential responses generated by the system 100 are responsive to the user input. The response arbitration component 860 may then generate the natural language response to the user input.

As shown in FIG. 11, the response arbitration component 860 receives the potential response data 843*a-n* (output by the language model shortlister component 840) at the response prompt generation component 1110. The response prompt generation component 1110 may further receive the user input data 827, the personalized context data 867 (from the language model shortlister component 840 or the personalized context component 865) and the context data 905.

The personalized context data 867 may represent one or more contextual signals associated with the user 805, such as information associated with a user profile of the user 805 (e.g., user ID, user behavioral information, user preferences, age, gender, historical user interaction data, devices associated with the user profile, etc.), which may be determined using, for example, a user recognition component 1295. In some embodiments, an indication of the user 805 and/or user profile may be included in the user input data 827 (e.g., as included in the output of the ASR component 1250.). In some embodiments, the personalized context data 867 may include dialog history data representing one or more user inputs and corresponding system-generated responses for a current interaction between the user 805 and the system 100.

As used herein, a "dialog" may refer to multiple related user inputs and system 100 outputs (e.g., through user device(s) 810) between the system and the user that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The response prompt generation component 1110 may process the potential response data 843*a-n*, the user input data 827, context data 905, and the personalized context data 867 (and, optionally, the further information received from the language model shortlister component 840) to generate prompt data 1115 representing a prompt for input to the response language model 1120. In some embodiments, the prompt data 1115 may be a directive for the response language model 1120 to determine whether one or more of the potential responses represented in the potential response data 843*a-n* are responsive to the user input given the other information (e.g., the personalized context data 867, the context data 905, the potential responses associated with the previous tasks (e.g., previous action response data) associated with the user input, and the user input data 827) included in the prompt data 1115. The prompt data may further be a directive for the response language model 1120 to, if the response language model 1120 determines that one or more of the potential responses are responsive to the user input, cause performance of the one or more corresponding actions (e.g., the one or more potential actions included in the selected responses) and/or cause the system 100 to inform the user 805 of the one or more selected responses. For example, in some embodiments, prompt data 1115 may further direct the response language model 1120 to generate a natural language summary of the one or more selected responses determined to be responsive to the user input. The prompt data 1115 may direct the response language model 1120 to cause the system 100 to output the natural language summary to the user 805.

In some embodiments, the prompt data 1115 may further be a directive for the response language model 1120 to, if the response language model 1120 determines that none of the potential responses are responsive to the user input, generate a request for additional information from a component of the system 100 and/or the user 805. As discussed above, the additional information may be any information usable to determine and/or perform an action responsive to the user input (e.g., to resolve an ambiguity associated with the user input and/or a task(s) associated with the user input).

In some embodiments, the response prompt generation component 1110 may also include in the prompt data a directive to output a response that satisfies certain conditions. Such conditions may relate to generating a response that is unbiased (toward protected classes, such as gender, race, age, etc.), non-harmful, profanity-free, etc. For example, the prompt data 1115 may include "Please generate a polite, respectful, and safe response and one that does not violate protected class policy."

The response language model 1120 processes the prompt data 1115 to generate the model output data 1125 representing the one or more selected responses determined to be responsive to the user input, the natural language summary of the one or more selected responses, and/or the request for additional information.

If the response language model 1120 determines that one or more of the potential responses are responsive to the user input, the response language model 1120 may generate the model output data 1125 to represent the one or more selected responses or a natural language summary of the one or more selected responses to be output to the user. For example, based on processing the first example prompt data above, the response language model 1120 may select one of the potential responses (e.g., the potential responses from skill component A (e.g., a weather skill component)) determined to be responsive to the user input to generate model output data 1125*a*: {"It is currently 70 degrees, with a high of 75 and a low of 68,"} or the like. For further example, based on processing the first example prompt data provided above, the response language model 1120 may select more than one of the potential responses (e.g., the potential responses from both the skill component A and skill component B) determined to be responsive to the user input and generate a summary of the selected responses to generate model output data 1125*b*: {"It is expected to be mostly sunny today, with a high of 75 and a low of 68, but with a chance of rain in the late afternoon,"} or the like.

As another example, based on processing the second example prompt data provided above, the response language model 1120 may select one of the potential responses (e.g., the potential response from Component A (e.g., the personalized context component 865) representing that the user ordered Brooklyn style pizza from [Pizza Company 1 Name]) determined to be responsive to the user input to generate model output data 1125*c*: {"Ok, I will place an order for Brooklyn style pizza from [Pizza Company 1 Name],"} or the like. As a further example, based on processing the second example prompt data provided above, the response language model 1120 may select more than one of the potential responses (e.g., the potential responses from both component A and API A) determined to be responsive to the user input and generate a summary of the selected responses to generate the model output data 1125*d*: {"Ok, I will place an order for Brooklyn style pizza from [Pizza Company 1 Name] using [Food Ordering Application 1] API,"} or the like.

As such, the response language model 1120 may select between the one or more potential responses from one or more different components (e.g., for the first example prompt data, the potential responses from the skill component A and the skill component B and, for the second example prompt data, the potential responses from Component A, API A, and API B) to determine that a subset of the potential responses are responsive to the user input. Thereafter, the response language model 1120 may cause output of the selected responses (e.g., the subset of potential responses) or a natural language summary of the selected responses to the user.

In some embodiments, the response arbitration component 860 may also generate and send a directive to the components, (e.g., API(s), components, agents, etc.) configured to perform the potential actions included in the selected responses to cause performance of the potential actions (or another component of the system 100 configured to cause the components to perform the potential actions, such as the action plan execution component 845, which is discussed in more detail herein below). For example, in instances where the selected responses include a potential action to be performed, the response language model 1120 may further cause the corresponding components to perform the potential action (e.g., cause [Food Ordering Application 1] API to order the Brooklyn style pizza from [Pizza Company 1 Name] using [Food Ordering Application 1]). In other embodiments, the system 100 may not generate and/or send the directive until approval to perform the action(s) is received from the user 805.

If the response language model 1120 determines that none of the potential responses are responsive to the user input and/or that an ambiguity exists with respect to the user input and/or one or more of the determined tasks, the response language model 1120 may generate the model output data 1125 to represent a request to be output to the user and/or the personalized context component 865. For example, based on processing the first example prompt data provided above, the response language model 1120 may determine an ambiguity exists with respect to the size of the pizza to be ordered and may generate the model output data 1125*e*: {"What size pizza should I order?",} {"What size pizza does the user usually order?",} or the like to be output to the user and/or sent to the personalized context component 865.

The response language model 1120 may send the model output data 1125 to the compliance component 1130, which is configured to determine whether model output data generated by the response language model 1120 is appropriate for output to the user 805. In other words, the compliance component 1130 processes the model output data 1125 to determine whether the model output data 1125 includes any inappropriate/sensitive information that should not be output to the user 805 (e.g., confidential information, offensive language, etc.). In some embodiments, the compliance component 1130 may be configured to compare the model output data 1125 to one or more words determined to be inappropriate/sensitive and should not be output to the user 805. In some embodiments, the compliance component 1130 may include/implement an ML model. For example, the ML model may process the model output data 1125 to determine whether the model output data 1125 includes any inappropriate/sensitive information. During training, the ML model may take as input a plurality of training natural language inputs, where the ML model is tasked with classifying a natural language input as including inappropriate/sensitive information or not. The output of the ML model (e.g., 0, 1, a value between 0 and 1, or the like) resulting from processing with respect to a training natural language input may be compared to a corresponding label representing whether the natural language input includes inappropriate/sensitive information or not. Based on the comparison, one or more parameters of the ML may be configured. In some embodiments, the ML model may be a classifier.

If the output of the compliance component 1130 indicates that the model output data 1125 includes information that is not appropriate for output to the user 805, the compliance component 1130 may cause further processing of the model output data 1125 by downstream components to halt. In some embodiments, the response arbitration component 860 may cause the response language model 1120 to generate new responsive output data to be evaluated by the compliance component 1130. For example, the response arbitration component 860 may cause the response prompt generation component 1110 to generate new prompt data, which may include the prompt data 1115, the model output data 1125, and an indication that the model output data 1125 is not appropriate for output to the user 805. The new prompt data may be a directive to generate new model output data that is appropriate for output to the user 805.

If the output of the compliance component 1130 indicates that the model output data 1125 are appropriate for output to the user, the compliance component 1130 may send the model output data 1125 to the output routing component 1140. The output routing component 1140 processes the model output data 1125 to determine one or more components that are to be caused to process in response to the model output data 1125. In other words, the output routing component 1140 parses the model output data 1125 to determine one or more components that the responsive output data 862 is to be routed to (or that are to be caused to process based on the responsive output data 862).

For example, in an instance where the response language model 1120 determines that one or more of the potential responses are responsive to the user input and generates the responsive output data 862 including the one or more selected responses (or a natural language summary of the one or more selected responses)/the request for additional information, the output routing component 1140 may parse the model output data 1125 to determine the selected responses/the natural language summary and send the responsive output data 862 to a component configured to generate corresponding data to be output to the user 805. For example, the output routing component 1140 may send the responsive output data 862 to the TTS component 1256, which may process as described herein above to generate output audio data including synthesized speech corresponding to the responsive output data 862, which the system 100 may send to the user device 810 for output to the user 805.

In some embodiments, the system 100 may further include a component configured to generate visual output data (e.g., output image and/or video data) corresponding to the responsive output data 862, which may be sent to the user device 810 to be output to the user.

For further example, in embodiments where the model output data 1125 includes selected responses that include one or more potential actions to be performed, the output routing component 1140 may process as described herein above to determine the one or more selected responses/the natural language summary and send the responsive output data 862 to the one or more components associated with the selected responses. In such embodiments, the responsive output data 862 may further include a directive for the one or more components to perform the potential actions corresponding to the selected responses. For example, in some embodiments, the components corresponding to the potential responses included in the potential response data 843*a-n* may, after generating the potential responses, suspend processing required to perform the potential action included in the potential responses and await a directive from the system 100 to perform the potential action. As such, the output routing component 1140 may include the directive in the responsive output data 862 to cause the component to perform the potential action. In some embodiments, the output routing component 1140 may generate an API call configured to cause the component to perform the action.

In some embodiments, where the model output data 1125 includes selected responses that include one or more potential actions to be performed, the responsive output data 862 may further request authorization from the user 805 to perform the one or more potential actions responsive to the user input. After receiving the request authorization (e.g., via a subsequent user input) the response arbitration component 860 may generate and send the corresponding directive (or API call) to perform the one or more potential actions responsive to the user input. In some embodiments, the system 100 may store data indicating prior authorization to perform the one or more potential actions responsive to the user input (or one or more actions similar to the one or more potential actions), in which case the response arbitration component 860 may use such data as authorization to perform the one or more potential actions. For example, the user 805 may have previously provided authorization for a set of actions (e.g., turning on outside lights). Thereafter, the system 100 may determine the one or more potential actions to be performed in response to the user input data 827. If the system 100 determines that the one or more actions are included in the set of actions previously authorized by the user 805, the system 100 may not ask for further authorization prior to causing the one or more potential actions to be performed.

For further example, in an instance where the response language model 1120 generates the model output data 1125 including a request for additional information (in response to the response language model 1120 determining that none of the potential responses are responsive to the user input and/or an ambiguity exists with respect to the user input and/or one or more of the tasks), which may be determined by the output routing component 1140 based on, for example, the model output data 1125 including a question, the output routing component 1140 may parse the model output data 1125 to determine whether the request for additional information is to be sent to the personalized context component 865 and/or output to the user 805. In some embodiments, the response language model 1120 may include in the responsive output data 862 an indication of whether the request for additional information should be sent to the personalized context component 865 and/or output to the user 805. In some embodiments, unless otherwise indicated in the model output data 1125, the output routing component 1140 may determine to send the request for additional information to the personalized context component 865 prior to outputting the request for additional information to the user 805. In the instance where the personalized context component 865 is unable to resolve the ambiguity (or a component of the system 100 is unable to resolve the ambiguity using the personalized context data generated by the personalized context component 865), the output routing component 1140 may determine the request for additional information is to be output to the user 805.

In some embodiments, the response arbitration component 860 may be configured to further process data representing a potential response to the user input that is generated by one or more other components of the system 100 not included in the language model orchestrator component 830. For example, the response arbitration component 860 may further receive data from an orchestrator component 1230 (discussed in detail herein below with respect to FIG. 12) representing a potential response to the user input (e.g., the output of the skill component 1254), where the orchestration of the processing performed to generate the potential response was performed by the orchestrator component 1230, rather than the language model orchestrator component 830. In such embodiments, the response arbitration component 860 may be further configured to arbitrate between first potential responses received as a result of the processing of the language model orchestrator component 830 and second potential responses received as a result of the processing of the orchestrator component 1230. As discussed above, the response arbitration component 860 may select one or more portions (e.g., potential actions, potential responses, etc.) of the first potential responses and/or the second potential responses that are determined to be responsive to the user input and cause output of the one or more portions (or a summarized representation of the one or more portions) and/or performance of the potential actions corresponding to the selected responses.

In some embodiments, the data received from the orchestrator component 1230 may be included in the potential response data 843*a-n*. For example, the orchestrator component 1230 may be determined to be configured to perform a function (e.g., cause another component(s) to perform a function) potentially relevant to the user input such that the language model shortlister component 840 may cause the orchestrator component 1230 to generate potential responses potentially responsive to the user input, which may be included in the potential response data 843*a-n* sent to the response arbitration component 860.

In some embodiments, the language models 920, 940, 1040, 1120 may be fine-tuned to perform a particular task(s). Fine-tuning of the language models 920, 940, 1040, 1120 may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, one or more components of the system 100 discussed herein above may be configured to begin processing with respect to data as soon as the data or a portion of the data is available to the one or more components. Some components of the system 100 are generative components/models that can begin processing with respect to portions of data as they are available, instead of waiting to initiate processing after the entirety of data is available. In other words, the system 100 may be configured to stream portions of data associated with processing with respect to a user input to the one or more components such that the one or more components may begin performing their configured processing with respect to that data as soon as it is available to the one or more components. For example, if the output of the task determination language model 920, the task selection language model 940, and/or the shortlister language model 1040 indicates that additional information is needed to complete a first task associated with a user input, a request for the additional information may be sent to the personalized context component 865. Thereafter, the task determination language model 920, the task selection language model 940, and/or the shortlister language model 1040 may continue to process to complete their configured operations. For example, while the personalized context component 865 is processing to determine the additional information, the system 100 may begin processing with respect to a second task associated with the user input. Thereafter, the output of the personalized context component 865 may be sent to the response arbitration component 860 such that once the response arbitration component 860 receives the output of the language model shortlister component 840, the response arbitration component 860 may resolve the ambiguity that resulted in the request for additional information in order to generate the responsive output data 862. For further example, if the user input data 827 is generated to include the natural language representation of the user input, but the processing required to determine the corresponding contextual signals (e.g., weather data, time of data, dialog history, device information, etc.) is yet to be completed, the task generation component 835 may begin processing with respect to the natural language representation of the user input. Once the corresponding contextual signals have been generated, the task generation component 835 may begin processing with respect to the contextual signals and may update downstream components with the result of the processing with respect to the contextual signals.

As another example, if the task generation component 835 determines that more than one task is to be completed to perform an action responsive to a user input, and the language model shortlister component 840 processes as described herein above to cause one or more components to generate potential responses with respect to a first task of the more than one tasks, the language model shortlister component 840 may send the potential responses (and a representation of the user input and the current task) to the response arbitration component 860 to process as described herein above with respect to those potential responses while the system 100 (e.g., the task generation component 835 and/or the language model shortlister component 840) completes processing with respect to the remaining tasks of the one or more tasks. Therefore, the response arbitration component 860 may process as described herein to select between the potential responses associated with the first task while the potential responses associated with one or more of the remaining tasks is completed. As such, the response arbitration component 860 may only need to arbitrate between the potential responses associated with the first task that were previously selected by the response arbitration component 860 as being responsive to the first task when the response arbitration component 860 later processes with respect to further potential responses associated with further tasks.

As a further example, if the API retrieval component 1020 determines (e.g., with a confidence value that meets or exceeds a particular threshold) that a particular API or component description should be included in the relevant API data, the API retrieval component 1020 may provide the corresponding relevant API data to the shortlister prompt generation component 1010 so that the shortlister prompt generation component 1010 may begin processing with respect to the relevant API data while the API retrieval component 1020 continues to determine one or more further relevant API data. In general, the system 100 is capable of performing such streaming and processing of portions of data discussed herein (e.g., for processing with respect to a user input) and updating downstream components with the results of processing of newly available portions of data as the data becomes available for processing.

Figure 12:
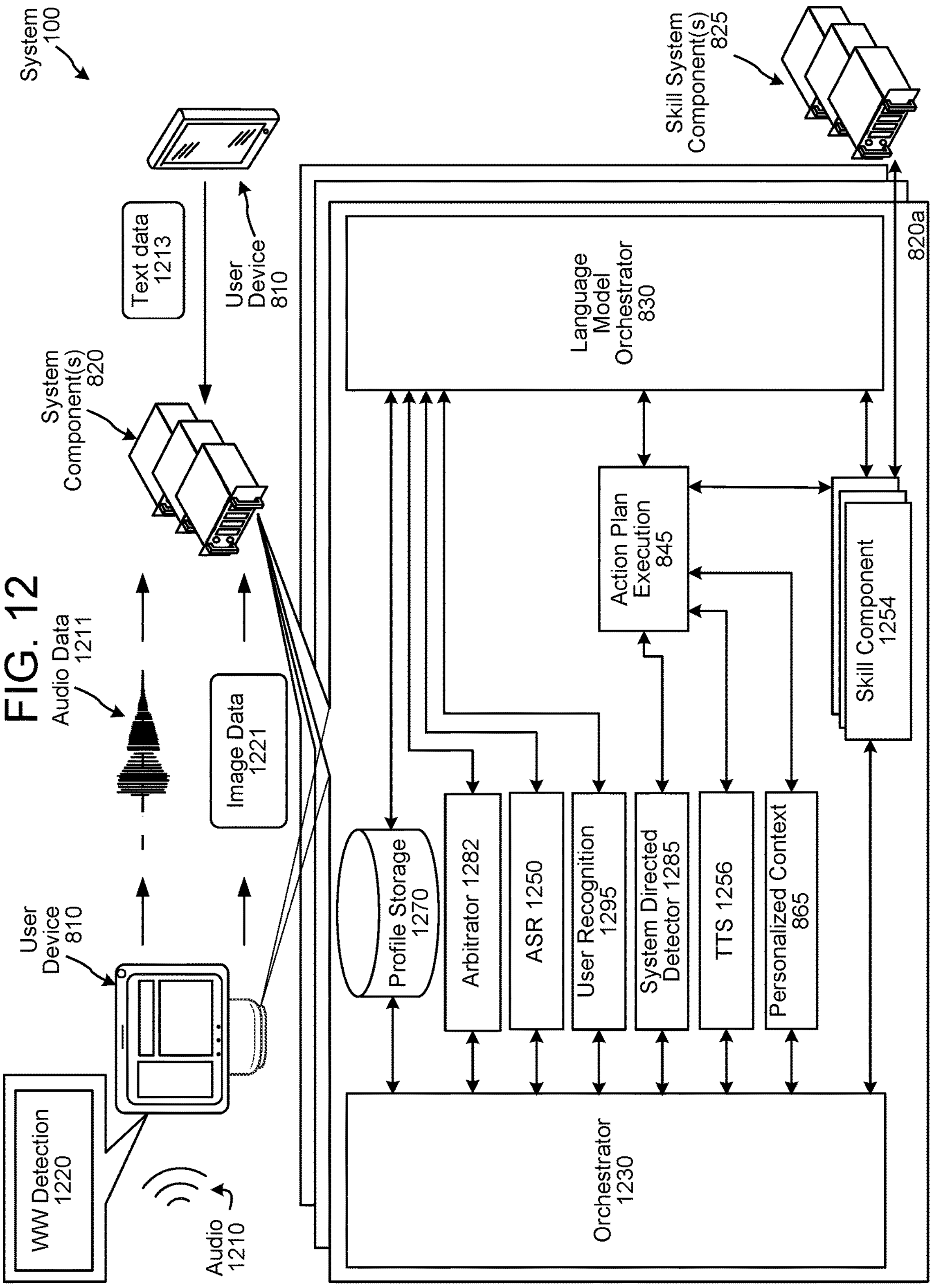
FIG. 12 is a conceptual diagram illustrating components of the system, according to embodiments of the present disclosure.

The system 100 may operate using various components as described in FIG. 12. The various components may be located on same or different physical devices. Communication between various components may occur directly or across a network(s) 199. The user device 810 may include audio capture component(s), such as a microphone or array of microphones of a user device 810, captures audio 1210 and creates corresponding audio data. Once speech is detected in audio data representing the audio 1210, the user device 810 may determine if the speech is directed at the user device 810/system component(s). In at least some embodiments, such determination may be made using a wakeword detection component 1220. The wakeword detection component 1220 may be configured to detect various wakewords. In at least some examples, each wakeword may correspond to a name of a different digital assistant. An example wakeword/digital assistant name is "Alexa." In another example, input to the system may be in form of text data 1213, for example as a result of a user typing an input into a user interface of user device 810. Other input forms may include indication that the user has pressed a physical or virtual button on user device 810, the user has made a gesture, etc. The user device 810 may also capture images using camera(s) of the user device 810 and may send image data 1221 representing those image(s) to the system component(s). The image data 1221 may include raw image data or image data processed by the user device 810 before sending to the system component(s). The image data 1221 may be used in various manners by different components of the system to perform operations such as determining whether a user is directing an utterance to the system, interpreting a user command, responding to a user command, etc.

The wakeword detection component 1220 of the user device 810 may process the audio data, representing the audio 1210, to determine whether speech is represented therein. The user device 810 may use various techniques to determine whether the audio data includes speech. In some examples, the user device 810 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 810 may implement a classifier configured to distinguish speech from background noise. The classifier may be implemented by techniques such as linear classifiers, support vector machines, and decision trees. In still other examples, the user device 810 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 1210, is analyzed to determine if specific characteristics of the audio data match preconfigured acoustic waveforms, audio signatures, or other data corresponding to a wakeword.

Thus, the wakeword detection component 1220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 1220 and/or input is detected by an input detector, the user device 810 may "wake" and begin transmitting audio data 1211, representing the audio 1210, to the system component(s) 820. The audio data 1211 may include data corresponding to the wakeword; in other embodiments, the portion of the audio corresponding to the wakeword is removed by the user device 810 prior to sending the audio data 1211 to the system component(s) 820. In the case of touch input detection or gesture based input detection, the audio data may not include a wakeword.

In some implementations, the system 100 may include more than one system component(s). The system component(s) 820 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 1220 may result in sending audio data to system component(s) a for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill component(s) 1254 of one or more system component(s) 820.

The user device 810/system component(s) may also include a system directed input detector 1285. The system directed input detector 1285 may be configured to determine whether an input to the system (for example speech, a gesture, etc.) is directed to the system or not directed to the system (for example directed to another user, etc.). The system directed input detector 1285 may work in conjunction with the wakeword detection component 1220. If the system directed input detector 1285 determines an input is directed to the system, the user device 810 may "wake" and begin sending captured data for further processing. If data is being processed the user device 810 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 1285 determines an input is not directed to the system (such as a speech or gesture directed to another user) the user device 810 may discard the data and take no further action for processing purposes. In this way the system 100 may prevent processing of data not directed to the system, thus protecting user privacy. As an indicator to the user, however, the system may output an audio, visual, or other indicator when the system directed input detector 1285 is determining whether an input is potentially device directed. For example, the system may output an orange indicator while considering an input, and may output a green indicator if a system directed input is detected. Other such configurations are possible.

Upon receipt by the system component(s) 820, the audio data 1211 may be sent to an orchestrator component 1230 and/or the language model orchestrator component 830. The orchestrator component 1230 may include memory and logic that enables the orchestrator component 1230 to transmit various pieces and forms of data to various components of the system, as well as perform other operations as described herein. In some embodiments, the orchestrator component 1230 may optionally be included in the system component(s) 820. In embodiments where the orchestrator component 1230 is not included in the system component(s) 820, the audio data 1211 may be sent directly to the language model orchestrator component 830. Further, in such embodiments, each of the components of the system component(s) 820 may be configured to interact with the language model orchestrator component 830, the action plan execution component 845, and/or the API provider component.

In some embodiments, the system component(s) 820 may include an arbitrator component 1282, which may be configured to determine whether the orchestrator component 1230 and/or the language model orchestrator component 830 are to process with respect to the audio data 1211. In some embodiments, the language model orchestrator component 830 may be selected to process with respect to the audio data 1211 only if the user 805 associated with the audio data 1211 (or the user device 810 that captured the audio 1210) has previously indicated that the language model orchestrator component 830 may be selected to process with respect to user inputs received from the user 805.

In some embodiments, the arbitrator component 1282 may determine the orchestrator component 1230 and/or the language model orchestrator component 830 are to process with respect to the audio data 1211 based on metadata associated with the audio data 1211. For example, the arbitrator component 1282 may be a classifier configured to process a natural language representation of the audio data 1211 (e.g., output by the ASR component 1250) and classify the corresponding user input as to be processed by the orchestrator component 1230 and/or the language model orchestrator component 830. For further example, the arbitrator component 1282 may determine whether the device from which the audio data 1211 is received is associated with an indicator representing the audio data 1211 is to be processed by the orchestrator component 1230 and/or the language model orchestrator component 830. As an even further example, the arbitrator component 1282 may determine whether the user (e.g., determined using data output from the user recognition component 1295) from which the audio data 1211 is received is associated with a user profile including an indicator representing the audio data 1211 is to be processed by the orchestrator component 1230 and/or the language model orchestrator component 830. As another example, the arbitrator component 1282 may determine whether the audio data 1211 (or the output of the ASR component 1250) corresponds to a request representing that the audio data 1211 is to be processed by the orchestrator component 1230 and/or the language model orchestrator component 830 (e.g., a request including "let's chat" may represent that the audio data 1211 is to be processed by the language model orchestrator component 830).

In some embodiments, if the arbitrator component 1282 is unsure (e.g., a confidence score corresponding to whether the orchestrator component 1230 and/or the language model orchestrator component 830 is to process is below a threshold), then the arbitrator component 1282 may send the audio data 1211 to both of the orchestrator component 1230 and the language model orchestrator component 830. In such embodiments, the orchestrator component 1230 and/or the language model orchestrator component 830 may include further logic for determining further confidence scores during processing representing whether the orchestrator component 1230 and/or the language model orchestrator component 830 should continue processing, as is discussed further herein below.

The arbitrator component 1282 may send the audio data 1211 to an ASR component 1250. In some embodiments, the component selected to process the audio data 1211 (e.g., the orchestrator component 1230 and/or the language model orchestrator component 830) may send the audio data 1211 to the ASR component 1250. The ASR component 1250 may transcribe the audio data 1211 into text data. The text data output by the ASR component 1250 represents one or more than one (e.g., in the form of an N-best list) ASR hypotheses representing speech represented in the audio data 1211. The ASR component 1250 interprets the speech in the audio data 1211 based on a similarity between the audio data 1211 and pre-established language models. For example, the ASR component 1250 may compare the audio data 1211 with models for sounds (e.g., acoustic units such as phonemes, senons, phones, etc.) and sequences of sounds to identify words that match the sequence of sounds of the speech represented in the audio data 1211. The ASR component 1250 sends the text data generated thereby to the arbitrator component 1282, the orchestrator component 1230, and/or the language model orchestrator component 830. In instances where the text data is sent to the arbitrator component 1282, the arbitrator component 1282 may send the text data to the component selected to process the audio data 1211 (e.g., the orchestrator component 1230 and/or the language model orchestrator component 830). The text data sent from the ASR component 1250 to the arbitrator component 1282, the orchestrator component 1230, and/or the language model orchestrator component 830 may include a single top-scoring ASR hypothesis or may include an N-best list including multiple top-scoring ASR hypotheses. An N-best list may additionally include a respective score associated with each ASR hypothesis represented therein.

In some embodiments, the orchestrator component 1230 may cause a NLU component (not shown) to perform processing with respect to the ASR data generated by the ASR component 1250. The NLU component may attempt to make a semantic interpretation of the phrase(s) or statement(s) represented in the ASR data input therein by determining one or more meanings associated with the phrase(s) or statement(s) represented in the text data. The NLU component may determine an intent representing an action that a user desires be performed and may determine information that allows a device (e.g., the device 810, the system component(s) 820, a skill component 1254, a skill system component(s) 825, etc.) to execute the intent. For example, if the ASR data corresponds to "play the 5th Symphony by Beethoven," the NLU component may determine an intent that the system output music and may identify "Beethoven" as an artist/composer and "5th Symphony" as the piece of music to be played. For further example, if the ASR data corresponds to "what is the weather," the NLU component may determine an intent that the system output weather information associated with a geographic location of the device 810. In another example, if the ASR data corresponds to "turn off the lights," the NLU component may determine an intent that the system turn off lights associated with the device 810 or the user 805. However, if the NLU component is unable to resolve the entity—for example, because the entity is referred to by anaphora such as "this song" or "my next appointment"—the system can send a decode request to another speech processing system for information regarding the entity mention and/or other context related to the utterance. The natural language processing system may augment, correct, or base results data upon the ASR data as well as any data received from the system.

The NLU component may return NLU results data (which may include tagged text data, indicators of intent, etc.) back to the orchestrator component 1230. The orchestrator component 1230 may forward the NLU results data to a skill component(s) 1254. If the NLU results data includes a single NLU hypothesis, the NLU component and the orchestrator component 1230 may direct the NLU results data to the skill component(s) 1254 associated with the NLU hypothesis. If the NLU results data includes an N-best list of NLU hypotheses, the NLU component and the orchestrator component 1230 may direct the top scoring NLU hypothesis to a skill component(s) 1254 associated with the top scoring NLU hypothesis. The system may also include a post-NLU ranker which may incorporate other information to rank potential interpretations determined by the NLU component.

In some embodiments, after determining that the orchestrator component 1230 and/or the language model orchestrator component 830 should process with respect to the user input data 827, the arbitrator 1282 may be configured to periodically determine whether the orchestrator component 1230 and/or the language model orchestrator component 830 should continue processing with respect to the user input data 827. For example, after a particular point in the processing of the orchestrator component 1230 (e.g., after performing NLU, prior to determining a skill component 1254 to process with respect to the user input data 827, prior to performing an action responsive to the user input, etc.) and/or the language model orchestrator component 830 (e.g., after selecting a task to be completed, after receiving the action response data from the one or more components, after completing a task, prior to performing an action responsive to the user input, etc.) the orchestrator component 1230 and/or the language model orchestrator component 830 may query the arbitrator component 1282 has determined that the orchestrator component 1230 and/or the language model orchestrator component 830 should halt processing with respect to the user input data 827. As discussed above, the system 100 may be configured to stream portions of data associated with processing with respect to a user input to the one or more components such that the one or more components may begin performing their configured processing with respect to that data as soon as it is available to the one or more components. As such, the arbitrator component 1282 may cause the orchestrator component 1230 and/or the language model orchestrator component 830 to begin processing with respect to a user input as soon as a portion of data associated with the user input data 827 is available (e.g., the ASR data, context data, output of the user recognition component 1295. Thereafter, once the arbitrator component 1282 has enough data to perform the processing described herein above to determine whether the orchestrator component 1230 and/or the language model orchestrator component 830 is to process with respect to the user input, the arbitrator component 1282 may inform the corresponding component (e.g., the orchestrator component 1230 and/or the language model orchestrator component 830) to continue/halt processing with respect to the user input at one of the logical checkpoints in the processing of the orchestrator component 1230 and/or the language model orchestrator component 830.

As discussed herein above, in some embodiments, the language model shortlister component 840 (e.g., via the API retrieval component 1020 and/or the shortlister language model 1040) may be configured to select the orchestrator component 1230 to process with respect to the user input and/or a current task to return action response data (e.g., the action response data 855*a*) representing a response to the user input/current task or a description of an action the orchestrator component 1230 may cause to be performed in response to the user input/current task. As such, in some embodiments, although the language model orchestrator component 830 is determined to process with respect to a user input, the language model orchestrator component 830 may determine, during such processing, that the orchestrator component 1230 should process with respect to the user input.

A skill system component(s) 825 may communicate with a skill component(s) 1254 within the system component(s)

820 directly with the orchestrator component 1230 and/or the action plan execution component 845, or with other components. A skill system component(s) 825 may be configured to perform one or more actions. An ability to perform such action(s) may sometimes be referred to as a "skill." That is, a skill may enable a skill system component(s) 825 to execute specific functionality in order to provide data or perform some other action requested by a user. For example, a weather service skill may enable a skill system component(s) 825 to provide weather information to the system component(s) 820, a car service skill may enable a skill system component(s) 825 to book a trip with respect to a taxi or ride sharing service, an order pizza skill may enable a skill system component(s) 825 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 820 may be configured with a skill component 1254 dedicated to interacting with the skill system component(s) 825. Unless expressly stated otherwise, reference to a skill, skill device, or skill component may include a skill component 1254 operated by the system component(s) 820 and/or skill operated by the skill system component(s) 825. Moreover, the functionality described herein as a skill or skill may be referred to using many different terms, such as an action, bot, app, or the like. The skill component 1254 and or skill system component(s) 825 may return output data to the orchestrator component 1230.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 1256. The TTS component 1256 may generate audio data (e.g., synthesized speech) from text data using one or more different methods. Text data input to the TTS component 1256 may come from a skill component 1254, the orchestrator component 1230, or another component of the system. In one method of synthesis called unit selection, the TTS component 1256 matches text data against a database of recorded speech. The TTS component 1256 selects matching units of recorded speech and concatenates the units together to form audio data. In another method of synthesis called parametric synthesis, the TTS component 1256 varies parameters such as frequency, volume, and noise to create audio data including an artificial speech waveform. Parametric synthesis uses a computerized voice generator, sometimes called a vocoder.

The user device 810 may include still image and/or video capture components such as a camera or cameras to capture one or more images. The user device 810 may include circuitry for digitizing the images and/or video for transmission to the system component(s) 820 as image data. The user device 810 may further include circuitry for voice command-based control of the camera, allowing a user 805 to request capture of image or video data. The user device 810 may process the commands locally or send audio data 1211 representing the commands to the system component(s) 820 for processing, after which the system component(s) 820 may return output data that can cause the user device 810 to engage its camera.

The system component(s) 820/the user device 810 may include a user recognition component 1295 that recognizes one or more users using a variety of data. However, the disclosure is not limited thereto, and the user device 810 may include the user recognition component 1295 instead of and/or in addition to the system component(s) 820 without departing from the disclosure.

The user recognition component 1295 may take as input the audio data 1211 and/or text data output by the ASR component 1250. The user recognition component 1295 may perform user recognition by comparing audio characteristics in the audio data 1211 to stored audio characteristics of users. The user recognition component 1295 may also perform user recognition by comparing biometric data (e.g., fingerprint data, iris data, etc.), received by the system in correlation with the present user input, to stored biometric data of users assuming user permission and previous authorization. The user recognition component 1295 may further perform user recognition by comparing image data (e.g., including a representation of at least a feature of a user), received by the system in correlation with the present user input, with stored image data including representations of features of different users. The user recognition component 1295 may perform additional user recognition processes, including those known in the art.

The user recognition component 1295 determines scores indicating whether user input originated from a particular user. For example, a first score may indicate a likelihood that the user input originated from a first user, a second score may indicate a likelihood that the user input originated from a second user, etc. The user recognition component 1295 also determines an overall confidence regarding the accuracy of user recognition operations.

Output of the user recognition component 1295 may include a single user identifier corresponding to the most likely user that originated the user input. Alternatively, output of the user recognition component 1295 may include an N-best list of user identifiers with respective scores indicating likelihoods of respective users originating the user input. The output of the user recognition component 1295 may be used to inform processing of the arbitrator component 1282, the orchestrator component 1230, and/or the language model orchestrator component 830 as well as processing performed by other components of the system.

The system component(s) 820/user device 810 may include a presence detection component that determines the presence and/or location of one or more users using a variety of data.

The system 100 (either on user device 810, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1270 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 810, the user profile (associated with the presented login information) may be updated to include information about the user device 810, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 1270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 12 may be illustrated as part of system component(s) 820, user device 810, or otherwise, the components may be arranged in other device(s) (such as in user device 810 if illustrated in system component(s) 820 or vice-versa, or in other device(s) altogether) without departing from the disclosure.

In at least some embodiments, the system component(s) may receive the audio data 1211 from the user device 810, to recognize speech corresponding to a spoken input in the received audio data 1211, and to perform functions in response to the recognized speech. In at least some embodiments, these functions involve sending directives (e.g., commands), from the system component(s) to the user device 810 (and/or other user devices 810) to cause the user device 810 to perform an action, such as output an audible response to the spoken input via a loudspeaker(s), and/or control secondary devices in the environment by sending a control command to the secondary devices.

Thus, when the user device 810 is able to communicate with the system component(s) over the network(s) 199, some or all of the functions capable of being performed by the system component(s) may be performed by sending one or more directives over the network(s) 199 to the user device 810, which, in turn, may process the directive(s) and perform one or more corresponding actions. For example, the system component(s), using a remote directive that is included in response data (e.g., a remote response), may direct the user device 810 to output an audible response (e.g., using TTS processing performed by an on-device TTS component) to a user's question via a loudspeaker(s) of (or otherwise associated with) the user device 810, to output content (e.g., music) via the loudspeaker(s) of (or otherwise associated with) the user device 810, to display content on a display of (or otherwise associated with) the user device 810, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 805 as part of a shopping function, establishing a communication session (e.g., a video call) between the user 805 and another user, and so on.

In at least some embodiments, a hybrid selector, of the user device 810, may send the audio data 1211 to the wakeword detection component 1220. If the wakeword detection component 1220 detects a wakeword in the audio data 1211, the wakeword detection component 1220 may send an indication of such detection to the hybrid selector. In response to receiving the indication, the hybrid selector may send the audio data 1211 to the system component(s) and/or the ASR component of the user device 810. The wakeword detection component 1220 may also send an indication, to the hybrid selector, representing a wakeword was not detected. In response to receiving such an indication, the hybrid selector may refrain from sending the audio data 1211 to the system component(s), and may prevent the ASR component of the user device 810 from further processing the audio data 1211. In this situation, the audio data 1211 can be discarded.

In some embodiments, the user device 810 may include some or all of the components illustrated in FIG. 12 and/or discussed herein above with respect to the system component(s) 820. In other embodiments, the components illustrated in FIG. 12 and/or discussed herein with respect to the system component(s) 820 may be distributed across the user device 810 and the system component(s) 820.

In at least some embodiments, the components of the user device 810 (e.g., on-device components) may not have the same capabilities as the components of the system component(s). For example, on-device components may be configured to handle only a subset of the natural language user inputs that may be handled by the system component(s) 820. For example, such subset of natural language user inputs may correspond to local-type natural language user inputs, such as those controlling devices or components associated with a user's home. In such circumstances the on-device components may be able to more quickly interpret and respond to a local-type natural language user input, for example, than processing that involves the system component(s). If the user device 810 attempts to process a natural language user input for which the on-device components are not necessarily best suited, the language processing results determined by the user device 810 may indicate a low confidence or other metric indicating that the processing by the user device 810 may not be as accurate as the processing done by the system component(s).

The hybrid selector, of the user device 810, may be configured to send and receive data/messages to and from the system component(s) 820. The hybrid selector may also be configured to allow the audio data 1211 to pass to the system component(s) 820 or components on the user device 810.

In some embodiments, the hybrid selector may wait for response data from either or both of the system component(s) 820 or the local user device 810 processing components. However, the disclosure is not limited thereto, and in some examples the hybrid selector may send the audio data 1211 only to the local processing component(s) without departing from the disclosure. For example, the user device 810 may process the audio data 1211 locally without sending the audio data 1211 to the system component(s) 820.

In at least some embodiments, the user device 810 may include, or be configured to use, one or more skill components that may work similarly to the skill component(s) 1254 implemented by the system component(s).

Additionally or alternatively, the user device 810 may be in communication with one or more skill system component(s) 825. For example, a skill system component(s) 825 may be located in a remote environment (e.g., separate location) such that the user device 810 may only communicate with the skill system component(s) 825 via the network(s) 199. However, the disclosure is not limited thereto. For example, in at least some embodiments, a skill system component(s) 825 may be configured in a local environment (e.g., home server and/or the like) such that the user device 810 may communicate with the skill system component(s) 825 via a private network, such as a local area network (LAN).

A skill system component(s) 825 may communicate with a skill component(s) 1254 within the system component(s) 820 directly with the orchestrator component 1230 and/or the action plan execution component 845, or with other components. A skill system component(s) 825 may be configured to perform one or more actions. An ability to perform such action(s) may sometimes be referred to as a "skill." That is, a skill may enable a skill system component(s) 825 to execute specific functionality in order to provide data or perform some other action requested by a user. For example, a weather service skill may enable a skill system component(s) 825 to provide weather information to the system component(s) 820, a car service skill may enable a skill system component(s) 825 to book a trip with respect to a taxi or ride sharing service, an order pizza skill may enable a skill system component(s) 825 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 820 may be configured with a skill component 1254 dedicated to interacting with the skill system component(s) 825. Unless expressly stated otherwise, reference to a skill, skill device, or skill component may include a skill component 1254 operated by the system component(s) 820 and/or skill operated by the skill system component(s) 825. Moreover, the functionality described herein as a skill or skill may be referred to using many different terms, such as an action, bot, app, or the like. The skill component 1254 and or skill system component(s) 825 may return output data to the orchestrator component 1230.

Figure 13:
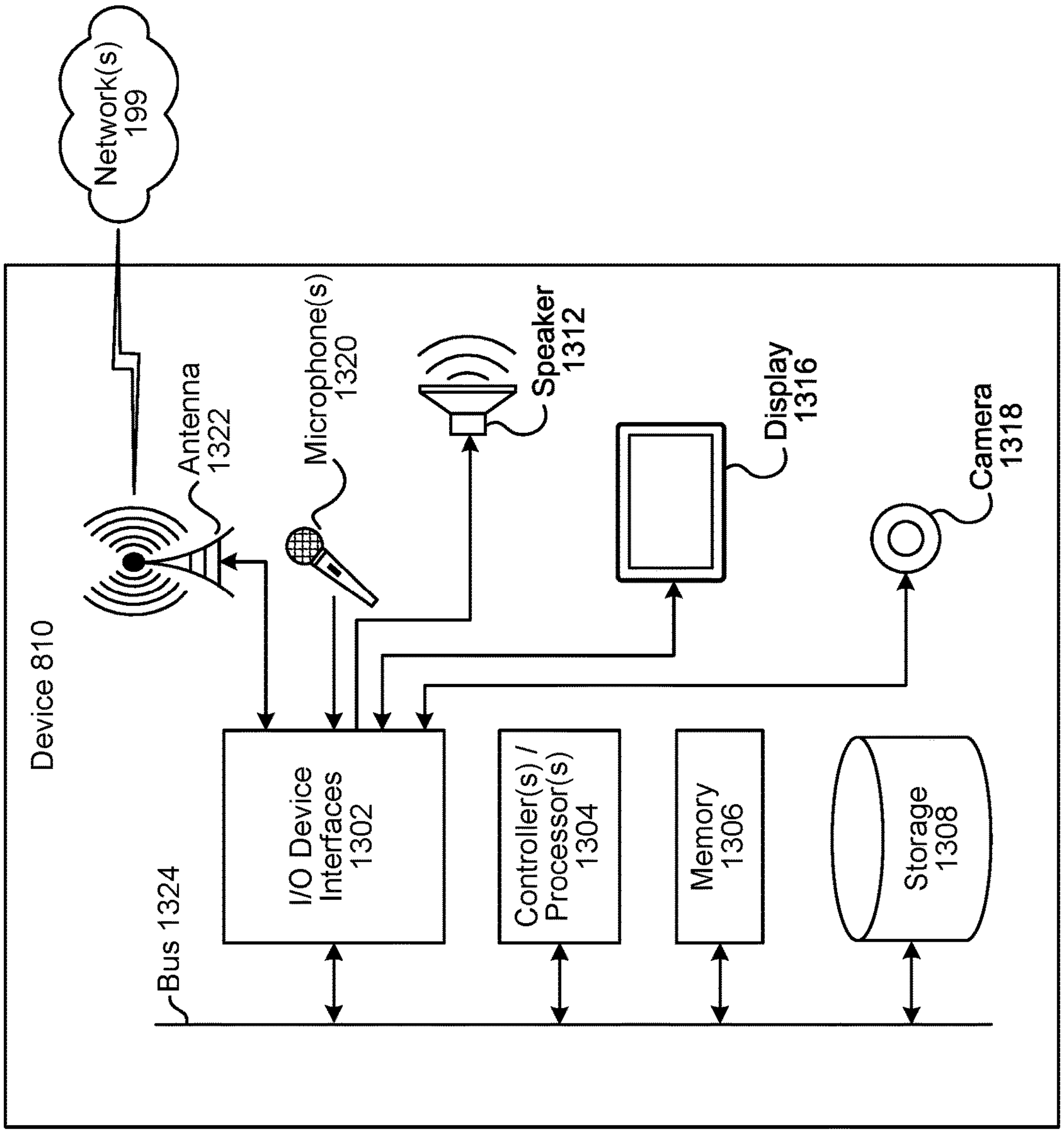
FIG. 13 is a block diagram conceptually illustrating example components of a device, according to embodiments of the present disclosure.
Figure 14:
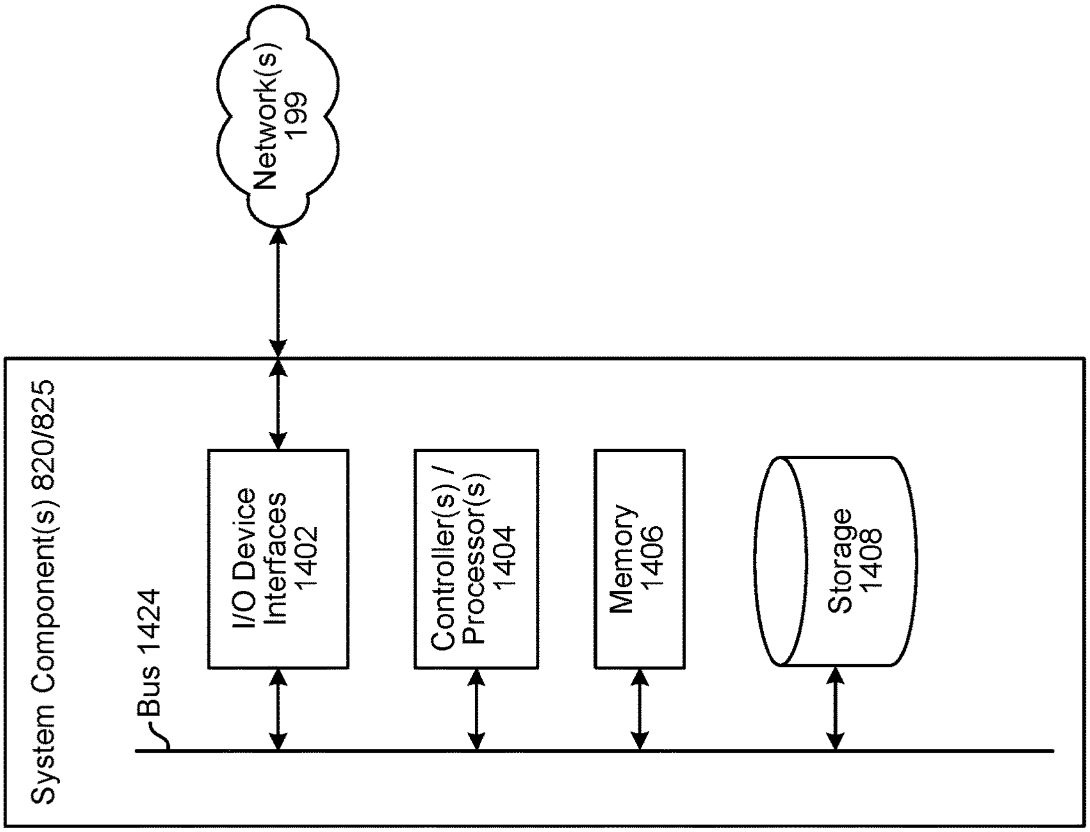
FIG. 14 is a block diagram conceptually illustrating example components of a system, according to embodiments of the present disclosure.

FIG. 13 is a block diagram conceptually illustrating a user device 810 that may be used with the system. FIG. 14 is a block diagram conceptually illustrating example components of a remote device, such as the natural language command processing system component(s), which may assist with ASR processing, NLU processing, etc., and a skill system component(s) 825. System component(s) (820/825) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 810 may operate locally to a user (e.g., within a same environment so the device may receive inputs and playback outputs for the user) the server/system component(s) may be located remotely from the user device 810 as its operations may not require proximity to the user. The server/system component(s) may be located in an entirely different location from the user device 810 (for example, as part of a cloud computing system or the like) or may be located in a same environment as the user device 810 but physically separated therefrom (for example a home server or similar device that resides in a user's home or business but perhaps in a closet, basement, attic, or the like). The system component(s) 820 may also be a version of a user device 810 that includes different (e.g., more) processing capabilities than other user device(s) 810 in a home/office. One benefit to the server/system component(s) being in a user's home/business is that data used to process a command/return a response may be kept within the user's home, thus reducing potential privacy concerns.

Multiple system components (820/825) may be included in the overall system 100 of the present disclosure, such as one or more natural language processing system component(s) 820 for performing ASR processing, one or more natural language processing system component(s) 820 for performing NLU processing, one or more skill system component(s) 825, etc. In operation, each of these systems may include computer-readable and computer-executable instructions that reside on the respective device (820/825), as will be discussed further below.

Each of these devices (810/820/825) may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random-access memory (RAM), non-volatile read only memory (ROM), non-volatile magnetoresistive memory (MRAM), and/or other types of memory. Each device (810/820/825) may also include a data storage component (1308/1408) for storing data and controller/processor-executable instructions. Each data storage component (1308/1408) may individually include one or more non-volatile storage types such as magnetic storage, optical storage, solid-state storage, etc. Each device (810/820/825) may also be connected to removable or external non-volatile memory and/or storage (such as a removable memory card, memory key drive, networked storage, etc.) through respective input/output device interfaces (1302/1402).

Computer instructions for operating each device (810/820/825) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (810/820/825) includes input/output device interfaces (1302/1402). A variety of components may be connected through the input/output device interfaces (1302/1402), as will be discussed further below. Additionally, each device (810/820/825) may include an address/data bus (1324/1424) for conveying data among components of the respective device. Each component within a device (810/820/825) may also be directly connected to other components in addition to (or instead of) being connected to other components across the bus (1324/1424).

Referring to FIG. 13, the user device 810 may include input/output device interfaces 1302 that connect to a variety of components such as an audio output component such as a speaker 1312, a wired headset or a wireless headset (not illustrated), or other component capable of outputting audio. The user device 810 may also include an audio capture component. The audio capture component may be, for example, a microphone 1320 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 810 may additionally include a display 1316 for displaying content. The user device 810 may further include a camera 1318.

Via antenna(s) 1322, the input/output device interfaces 1302 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1302/1402) may also include communication components that allow data to be exchanged between devices such as different physical servers in a collection of servers or other components.

The components of the user device(s) 810, the natural language command processing system component(s), or a skill system component(s) 825 may include their own dedicated processors, memory, and/or storage. Alternatively, one or more of the components of the user device(s) 810, the natural language command processing system component(s), or a skill system component(s) 825 may utilize the I/O interfaces (1302/1402), processor(s) (1304/1404), memory (1306/1406), and/or storage (1308/1408) of the user device(s) 810, natural language command processing system component(s), or the skill system component(s) 825, respectively. Thus, the ASR component 1250 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 810, the natural language command processing system component(s), and a skill system component(s) 825, as described herein, are illustrative, and may be located as a stand-alone device or may be included, in whole or in part, as a component of a larger device or system. As can be appreciated, a number of components may exist either on a system component(s) and/or on user device 810. For example, ASR component 1250 and TTS component 1256), etc., for example as illustrated in FIG. 12. Unless expressly noted otherwise, the system version of such components may operate similarly to the device version of such components and thus the description of one version (e.g., the system version or the local version) applies to the description of the other version (e.g., the local version or system version) and vice-versa.

Figure 15:
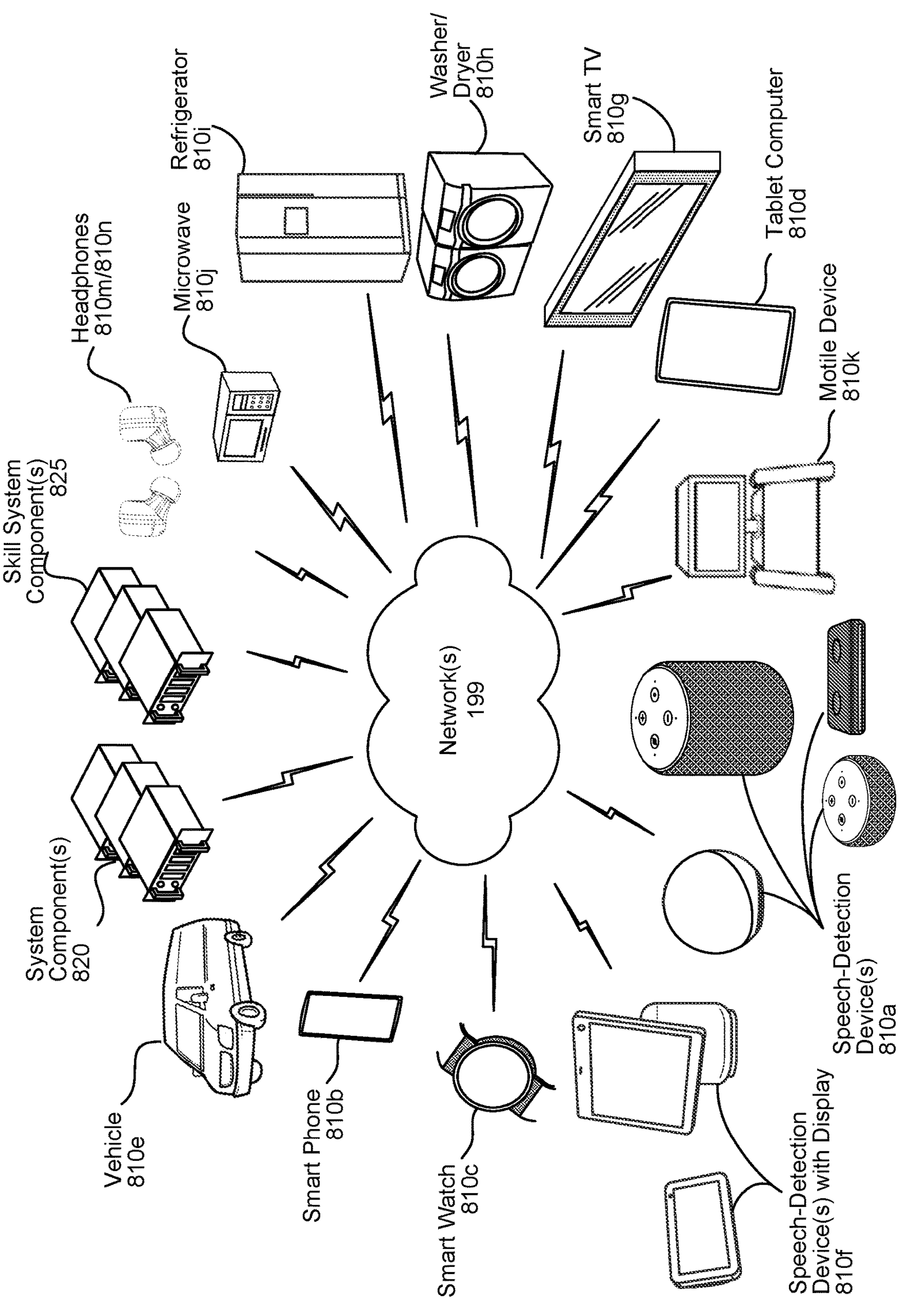
FIG. 15 illustrates an example of a network for use with the overall system, according to embodiments of the present disclosure.

As illustrated in FIG. 15, multiple devices (810*a*-810*n*, 820, 825) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection user device 810*a*, a smart phone 810*b*, a smart watch 810*c*, a tablet computer 810*d*, a vehicle 810*e*, a speech-detection device with display 810*f*, a display/smart television 810*g*, a washer/dryer 810*h*, a refrigerator 810*i*, a microwave 810*j*, autonomously motile user device 810*k* (e.g., a robot), etc., may be connected to the network(s) 199 through a wireless service provider, over a Wi-Fi or cellular network connection, or the like. Other devices are included as network-connected support devices, such as the natural language command processing system component(s) 820, the skill system component(s) 825, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 1250, etc. of the natural language command processing system component(s) 820.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
- receiving a dataset including a plurality of records, wherein a first record of the plurality of records includes a first plurality of natural language sentences and a second record of the plurality of records includes a second plurality of natural language sentences;
- processing the first record to determine a first plurality of lexical metrics corresponding to the first record, wherein the first plurality of lexical metrics includes:
  - a first number representing a first number of sentences in the first record, and
  - a second number representing a first average number of words per sentence in the first record;
- processing the second record to determine a second plurality of lexical metrics corresponding to the second record, wherein the second plurality of lexical metrics includes:
  - a third number representing a second number of sentences in the second record, and
  - a fourth number representing a second average number of words per sentence in the second record;
- processing the first record to determine first data representing a first summarized topic of the first record;
- processing the second record to determine second data representing a second summarized topic of the second record;
- determining, using a cosine distance similarity, a semantic measure between the first data and the second data, the semantic measure representing similarities between the first summarized topic and the second summarized topic;
- determining, using the semantic measure, that the first record and the second record correspond to different topics;
- based on the first plurality of lexical metrics, the second plurality of lexical metrics, and the semantic measure, determining a training dataset to include at least the first record and the second record;
- training a large language model (LLM) using the training dataset, wherein the LLM includes at least a decoder; and
- using the LLM to generate outputs having differing lexical characteristics.

2. The computer-implemented method of claim 1, further comprising:
- determining that the first number and the third second number are different;
- determining, using the first record, a first N-gram metric representing a first proportion of unique N-grams to a total number of N-grams in the first record;
- determining, using the second record, a second N-gram metric representing a second proportion of unique N-grams to a total number of N-grams in the second record;
- determining that the first N-gram metric and the second N-gram metric are different;
- determining, using the first record, first lexical density data representing a third proportion of content words to a total number of words in the first record;
- determining, using the second record, second lexical density data representing a fourth proportion of content words to a total number of words in the second record;
- determining that the first lexical density data and the second lexical density data are different; and
- determining the training dataset to include the first record and the second record further based on determining that the first number and the third number are different, determining that the first N-gram metric and the second N-gram metric are different, and determining that the first lexical density data and the second lexical density data are different.

3. The computer-implemented method of claim 1, further comprising:
- determining, using the first record, first syntactical complexity metric based on adjacent token dependencies and non-adjacent token dependencies in the first record;
- determining, using the second record, second syntactical complexity metric based on adjacent token dependencies and non-adjacent token dependencies in the second record;

determining that the first syntactical complexity metric and the second syntactical complexity metric are different;

determining a first version representing parts-of-sentence (POS) tags of the first record;

determining, using the first version, a first N-gram metric representing a first proportion of unique N-grams to a total number of N-grams in the first version;

determining a second version representing POS tags of the second record;

determining, using the second version, a second N-gram metric representing a second proportion of unique N-grams to a total number of N-grams in the second version;

determining that the first N-gram metric and the second N-gram metric are different; and determining the training dataset to include the first record and the second record further based on determining that the first syntactical complexity metric and the second syntactical complexity metric are different and determining that the first N-gram metric and the second N-gram metric are different.

4. The computer-implemented method of claim 1, further comprising:

determining first pronoun metric representing a first number of different pronouns in the first record;

determining second pronoun metric representing a second number of different pronouns in the second record;

determining first question metric representing a first number of different question words in the first record;

determining second question metric representing a second number of different question words in the second record; and determining the training dataset to include the first record and the second record further based on the first pronoun metric, the second pronoun metric, the first question metric and the second question metric.

5. A computer-implemented method comprising:

receiving input data including a plurality of records, wherein a first record of the plurality of records includes a first plurality of sentences;

determining lexical metrics corresponding to the first record, wherein the lexical metrics include:

a first number representing a number of sentences in the first record, and a second number representing an average number of words per sentence in the first record;

determining, using a trained model, a first topic corresponding to the first record, wherein the trained model is configured to classify an input based on a plurality of topic clusters;

determining, using the trained model, a second topic corresponding to a second record of the plurality of records;

determining, based on the first topic and the second topic, that the first record and the second record correspond to different topics;

based on the lexical metrics, determining a training dataset including the first record, wherein the training dataset is to be used to configure a transformer-based language model;

based on the second topic, determining the training dataset to include the second record;

training the transformer-based language model using the training dataset, wherein the transformer-based language model includes at least a decoder; and using the transformer-based language model to generate outputs having characteristics consistent with the characteristics of the training dataset.

6. The computer-implemented method of claim 5, further comprising:

determining first lexical density metric representing a first proportion of content words to a total number of words in the first record;

determining second lexical density metric representing a second proportion of content words to a total number of words in the second record;

determining a lexical diversity metric based on a difference between the first lexical density metric and the second lexical density metric; and associating the lexical diversity metric with the input data.

7. The computer-implemented method of claim 5, further comprising:

determining a first version of the first record by replacing entities in the first record with first data;

determining a second version of the second record by replacing entities in the second record with second data;

determining a structure diversity metric based on a semantic difference between the first version and the second version; and associating the structure diversity metric with the input data.

8. The computer-implemented method of claim 5, further comprising:

determining a pronoun metric representing a number of different pronouns in the first record;

determining a question metric representing a number of different question words in the first record; and associating the pronoun metric and the question metric with the first record.

9. The computer-implemented method of claim 5, further comprising:

determining a syntactical complexity metric based on adjacent token dependencies and non-adjacent token dependencies in the first record;

determining a first version of the first record representing parts-of-sentence (POS) tags of the first record;

determining, using the first version, a N-gram metric representing a first proportion of unique N-grams to a total number of N-grams in the first version; and associating the syntactical complexity metric and the N-gram metric with the first record.

10. The computer-implemented method of claim 5, further comprising:

determining a third number representing the number of sentences in the second record;

determining a Shannon Diversity Index using at least the first number and the third number; and associating the Shannon Diversity Index with the input data.

11. The computer-implemented method of claim 5, further comprising:

determining first topic data representing a first summary of the first record;

determining second topic data representing a second summary of the second record;

determining a topic semantic diversity metric between the first topic data and the second topic data; and associating the topic semantic diversity metric with the input data.

12. The computer-implemented method of claim 5, further comprising:

determining a readability metric corresponding to a third record of the plurality of records; and based on the readability metric, determining the training dataset to include the third record.

13. A system comprising:

at least one processor; and at least one memory including instructions that, when executed by the at least one processor, cause the system to:

receive input data including a plurality of records, wherein a first record of the plurality of records includes a first plurality of sentences;

determine lexical metrics corresponding to the first record, wherein the lexical metrics include:

a first number representing a number of sentences in the first record, and a second number representing an average number of words per sentence in the first record;

determine, using a trained model, a first topic corresponding to the first record, wherein the trained model is configured to classify an input based on a plurality of topic clusters;

determine, using the trained model, a second topic corresponding to a second record of the plurality of records;

determine, based on the first topic and the second topic, that the first record and the second record correspond to different topics;

based on the lexical metrics, determine a training dataset including the first record, wherein the training dataset is to be used to configure a transformer-based language model;

based on the second topic, determine the training dataset to include the second record;

train the transformer-based language model using the training dataset, wherein the transformer-based language model includes at least a decoder; and use the transformer-based language model to generate outputs having characteristics consistent with the characteristics of the training dataset.

14. The system of claim 13, wherein the at least one memory includes further instructions that, when executed by the at least one processor, further cause the system to:

determine first lexical density metric representing a first proportion of content words to a total number of words in the first record;

determine second lexical density metric representing a second proportion of content words to a total number of words in the second record;

determine a lexical diversity metric based on a difference between the first lexical density metric and the second lexical density metric; and associate the lexical diversity metric with the input data.

15. The system of claim 13, wherein the at least one memory includes further instructions that, when executed by the at least one processor, further cause the system to:

determine a first version of the first record by replacing entities in the first record with first data;

determine a second version of the second record by replacing entities in the second record with second data;

determine a structure diversity metric based on a semantic difference between the first version and the second version; and associate the structure diversity metric with the input data.

16. The system of claim 13, wherein the at least one memory includes further instructions that, when executed by the at least one processor, further cause the system to:

determine a pronoun metric representing a number of different pronouns in the first record;

determine a question metric representing a number of different question words in the first record; and associate the pronoun metric and the question metric with the first record.

17. The system of claim 13, wherein the at least one memory includes further instructions that, when executed by the at least one processor, further cause the system to:

determine a syntactical complexity metric based on adjacent token dependencies and non-adjacent token dependencies in the first record;

determine a first version of the first record representing parts-of-sentence (POS) tags of the first record;

determine, using the first version, a N-gram metric representing a first proportion of unique N-grams to a total number of N-grams in the first version; and associate the syntactical complexity metric and the N-gram metric with the first record.

18. The system of claim 13, wherein the at least one memory includes further instructions that, when executed by the at least one processor, further cause the system to:

determine a third number representing the number of sentences in the second record;

determine a Shannon Diversity Index using at least the first number and the third number; and associate the Shannon Diversity Index with the input data.

19. The system of claim 13, wherein the at least one memory includes further instructions that, when executed by the at least one processor, further cause the system to:

determine first topic data representing a first summary of the first record;

determine second topic data representing a second summary of the second record;

determine a topic semantic diversity metric between the first topic data and the second topic data; and associate the topic semantic diversity metric with the input data.

20. The system of claim 13, wherein the at least one memory includes further instructions that, when executed by the at least one processor, further cause the system to:

determine a readability metric corresponding to a third record of the plurality of records; and based on the readability metric, determine the training dataset to include the third record.

* * * * *